(12) United States Patent
Kannan et al.

(10) Patent No.: US 10,776,803 B2
(45) Date of Patent: *Sep. 15, 2020

(54) COMPUTERIZED PROMOTION AND MARKDOWN PRICE SCHEDULING

(71) Applicant: ORACLE INTERNATIONAL CORPORATION, Redwood Shores, CA (US)

(72) Inventors: Aswin Kannan, Chennai (IN); Kiran Panchamgam, Bedford, MA (US)

(73) Assignee: Oracle International Corporation, Redwood Shores, CA (US)

( * ) Notice: Subject to any disclaimer, the term of this patent is extended or adjusted under 35 U.S.C. 154(b) by 679 days.

This patent is subject to a terminal disclaimer.

(21) Appl. No.: 15/062,561

(22) Filed: Mar. 7, 2016

(65) Prior Publication Data

US 2017/0200180 A1 Jul. 13, 2017

Related U.S. Application Data

(63) Continuation-in-part of application No. 14/989,932, filed on Jan. 7, 2016, now Pat. No. 10,528,903.

(51) Int. Cl.
*G06Q 30/02* (2012.01)
*G06Q 10/08* (2012.01)

(52) U.S. Cl.
CPC ....... *G06Q 30/0223* (2013.01); *G06Q 10/087* (2013.01); *G06Q 30/0206* (2013.01); *G06Q 30/0235* (2013.01); *G06Q 30/0283* (2013.01)

(58) Field of Classification Search
None
See application file for complete search history.

(56) References Cited

U.S. PATENT DOCUMENTS 7,092,896 B2  8/2006  DeLurgio et al.
7,251,615 B2  7/2007  Woo
(Continued)

OTHER PUBLICATIONS

Patent Cooperation Treaty (PCT) International Search Report and Written Opinion in co-pending PCT International Appl. No. PCT/US2017/012417 (International Filing Date of Jan. 6, 2016) dated Feb. 24, 2017 (10 pgs.).

*Primary Examiner* — Eric W Stamber
*Assistant Examiner* — Alan Torrico-Lopez
(74) *Attorney, Agent, or Firm* — Kraguljac Law Group, LLC

(57) ABSTRACT

Systems, methods, and other embodiments associated with generating a price schedule are described. An inventory quantity for the item is allocated amongst a plurality of customer segments based on a predicted contribution of each customer segment to the objective function. For each customer segment, based on a quantity of inventory allocated to the customer segment, a promotion portion of the price schedule is determined that maximizes the objective function. Remaining inventory allocated to the plurality of customer segments at the end of the regular season is aggregated. Based on the aggregated inventory, a markdown portion of the price schedule for the item is determined that maximizes the objective function. The promotion portion and the markdown portion are combined to create a price schedule for the item. In one embodiment, a price schedule may be generated that includes promotions on top of markdown prices during the clearance season.

18 Claims, 10 Drawing Sheets

(56) References Cited

U.S. PATENT DOCUMENTS

| | | |
|---|---|---|
| 8,082,175 B2 | 12/2011 | Rosenberg et al. |
| 8,271,318 B2 | 9/2012 | Sanli et al. |
| 2003/0220830 A1 | 11/2003 | Myr |
| 2008/0033809 A1 | 2/2008 | Black et al. |
| 2008/0077459 A1* | 3/2008 | Desai ............... G06Q 10/06314 705/7.24 |
| 2011/0213648 A1* | 9/2011 | Mesaros ............... G06Q 30/02 705/14.19 |
| 2011/0313840 A1 | 12/2011 | Mason et al. |
| 2013/0090988 A1* | 4/2013 | Moore ............... G06Q 30/0202 705/7.35 |
| 2013/0132153 A1 | 5/2013 | Vakhutinsky et al. |
| 2013/0211877 A1 | 8/2013 | Kushkuley et al. |
| 2014/0200964 A1 | 7/2014 | Hassanzadeh et al. |
| 2015/0081393 A1 | 3/2015 | Cohen et al. |
| 2016/0189278 A1* | 6/2016 | Parpia ............... G06Q 30/0635 705/26.81 |

* cited by examiner

COMPUTERIZED PROMOTION AND MARKDOWN PRICE SCHEDULING

CROSS REFERENCE TO RELATED APPLICATIONS

This disclosure claims priority to and is a Continuation-in-Part of U.S. patent application Ser. No. 14/989,932 filed on Jan. 7, 2016, entitled "Computerized Promotion and Markdown Price Scheduling," which is incorporated herein by reference in its entirety for all purposes.

BACKGROUND

In the retail industry, pricing uniformly over a period of time is quite rare. For apparel and other short-life merchandise, customers respond to price drops and increases with higher and lower demand levels, respectively. Retailers use this consumer behavior and reduce product prices significantly towards the end of the season (also referred to as the clearance period) to sell their inventory completely. Retailers implement price drops in two formats: promotions and markdowns. Promotions are temporary price reductions which typically last a few weeks. Markdowns are permanent reductions in price. Promotions take place in the "regular" season for merchandise while markdowns occur during the "clearance" season. For example, the summer clothing collection may see promotions during the summer months, but if the inventory is high, then the summer collection is marked down towards the end of the summer season or at the beginning of the fall season. A notable feature of the clearance season is that typically once the price drops from the regular price, it does not rise again in that season.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Retailers with short-life cycle merchandise, like apparel, use promotions and markdowns to move inventory and maximize profits in a manner that clears the merchandise by the end of the selling system. Determining when to schedule promotions and markdowns and what prices should be assigned to merchandise during promotions and markdowns is a challenging problem for a retailer. In addition, a retailer often has business rules such as a maximum number of items that can be assigned promotion prices at the same time, that constrain the price schedule for each item. Further, different customer segments (e.g., single people, young people, parents, retirees, and so on) respond differently to promotions and markdowns, a fact which should be captured in the price scheduling process. Considering that many retailers have hundreds of different items each season, it can be seen that even a computerized approach to setting a price schedule for the items sold by a retailer can become infeasible.

Systems and methods are described herein that provide computerized promotion and markdown scheduling for a large number of items in an efficient manner. A different promotion schedule is created for different customer segments to leverage knowledge about the buying habits of different types of customers and to maximize profits. A promotion portion of the schedule (i.e., regular season) and a markdown portion of the schedule (i.e., clearance season) are both computed at the same time by the systems and methods described herein, allowing a retailer to consider different promotion and markdown approaches by adjusting constraints and pricing options.

Figure 1:
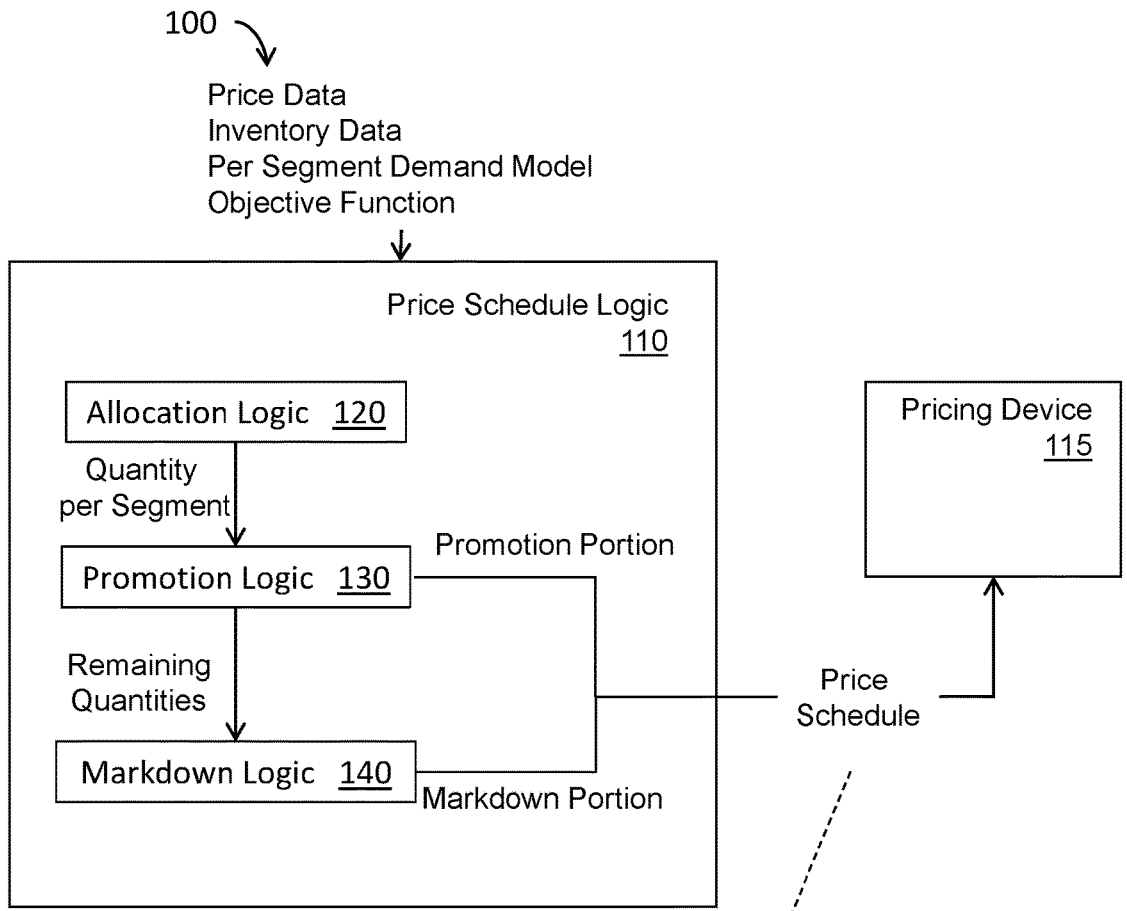
FIG. 1 illustrates one embodiment of a computerized system associated with promotion and markdown price scheduling.

FIG. 1 illustrates one embodiment of a computerized system 100 that generates a price schedule for a set of items. The price schedule is, for example, a data structure stored in memory that contains data values and/or records for information as described herein. The system 100 includes price schedule logic 110 that controls a processor to perform various operations described below (see FIG. 6). In one embodiment, price schedule logic 110 is implemented as computer instructions embodied in a module stored in a non-transitory computer storage medium where the instructions are configured as an executable algorithm configured to perform the functions as described herein when executed by at least the processor of a computing device.

The price schedule logic 110 interacts by way of electronic communication over network or Internet connection with a pricing device 115 used by a retailer. For the purposes of this description, the term "retailer" or "pricing device" is intended to include a computing device under the control of a retailer who prices items for sale and who is requesting, from the system 100, a price schedule for items sold by the retailer. The price schedule logic 110 is configured to receive electronic communications from the pricing device 115 that communicate price data for items, inventory data for the items, a per-segment demand model for the items, and/or a selected objective function.

The price data defines a set of prices that are to be considered for each item. The set of prices includes the regular price, promotion prices, and markdown prices for the item. In one embodiment, the promotion prices and the markdown prices are separated into two sets, neither of which includes the regular price for the item, to simplify the calculations in the promotion and markdown seasons. Sometimes a set of prices is referred to as a "price ladder" for an item. In one embodiment, cost data for each item is also input by the price schedule logic 110 for use in calculating profit.

Inventory data includes an "inventory quantity" which, for the purposes of this description, includes the initial inventory quantity of an item that will be on hand at the beginning of the regular season and, optionally, scheduled shipments of the item to replenish the stock during the regular season. To input or receive price and inventory data for a set of items, the price schedule logic 110 may query a database that stores such data (e.g., electronic records encoding price ladders and inventory and replenishment quantities).

The per-segment demand model may be provided by the retailer or may be otherwise accessible to the price schedule logic 110. In one embodiment, the per segment demand model is the scan-pro model. In one embodiment, the per-segment demand model is a stored set of instructions that, when executed by a processor, computes demand for an item based on the price of the item and other factors such as elasticity, promotion fatigue, seasonality, and so on. The per-segment demand model includes different demand parameter values for different customer segments. One example per-segment demand model will be described in detail below, however, it is to be understood that the systems and methods described herein are applicable to any demand model, including demand models that do not differentiate between different customer segments. In one embodiment, the retailer furnishes values for demand parameters based on their own sales histories and experience. In other embodiments, the price schedule logic 110 stores and maintains the per-segment demand model or obtains the per-segment demand model and parameter values from a different source.

The objective function defines the sales-related quantity that the retailer seeks to maximize. Example objective functions include profit and revenue. The revenue objective function will be described in more detail below, however, it is to be understood that the systems and methods described herein are suitable for use with any objective function.

The price schedule logic 110 is configured to generate a price schedule that includes a promotion portion and a markdown portion. The price schedule assigns to an item a series of prices selected from the set of prices for respective time periods (e.g., weeks or days) during a regular season and also a clearance season for the item. A price schedule for an item is generated for each customer segment. Example price schedules for a "singles" customer segment and a "moms" customer segment are shown in FIG. 1. It can be seen that the price schedule is different for the two customer segments during the "regular/promotion" portion of the price schedule, while the price schedule is the same for the two customer segments during the "clearance/markdown" portion of the price schedule. The price schedule logic 110 is configured to transmit, by way of a network connection, the price schedules to the pricing device 115 (FIG. 1) for use in pricing the item.

The promotion and markdown schedule problem increases proportionally when customer segments are taken into account. One of the challenges to performing per-segment promotion and markdown scheduling is that the different customer segments share the same inventory. Another challenge is that the markdown policies are typically the same across all customer segments while per-segment promotion pricing can be achieved by targeted marketing. The price schedule logic 110 includes allocation logic 120, promotion logic 130, and markdown logic 140 that together cooperate to address these challenges using a multi-phase process to generate the promotion and markdown portions of the price schedule.

The allocation logic 120 is configured to allocate the inventory quantity for either an individual item (e.g., SKU) or some grouping of items (e.g., accessories) amongst a plurality of customer segments based at least on a predicted contribution of each customer segment to the objective function. By allocating the inventory to each customer segment prior to performing the promotion price determination for each customer segment, the link between the customer segments is broken, greatly simplifying the process of generating the promotion portion and the markdown portion of the price schedule.

For example, accessories may be sold to three different customer segments: single women, mothers, and retirees. The per-segment demand model specifies the particular behaviors of these different types of customers by including different demand parameter values for each segment. The allocation logic 120 is configured to predict a contribution of each customer segment to the objective function. In one embodiment, based on the per-segment demand model, the allocation logic 120 may determine that i) when all the inventory quantity is allocated to the single women segment, $1200.00 in revenue (i.e., objective function) will be generated; ii) when all of the inventory quantity is allocated to mothers, $1000.00 in revenue will be generated, and iii) when all of the inventory quantity is allocated to retirees, $300.00 in revenue will be generated. The allocation logic 120 allocates the inventory quantity to the different customer segments based on this predicted contribution (e.g., 1200/(1200+1000+300) or 48% of the inventory quantity is allocated to the single women customer segment, and so on). In other embodiments, other methods of predicting the contribution of each customer segment to the objective function are used.

The promotion logic 130 is configured to determine the promotion portion of the price schedule. For each customer segment, based the quantity of inventory allocated to the customer segment, the promotion logic 130 is configured to determine the promotion portion of the price schedule that maximizes the objective function. The promotion portion assigns to the item a series of prices selected from the set of promotion prices for respective time periods during the regular season for the item.

The markdown logic 140 is configured to aggregate a quantity of remaining inventory in each customer segment at the end of the regular season. The markdown logic 140 is configured to, based at least on the aggregated inventory, determine a markdown portion of the price schedule for the item that maximizes the objective function. The markdown portion assigns a series of prices selected from the set of prices to the item for respective time periods during the clearance season for the item. The price schedule logic 110 combines the promotion portion and the markdown portion for each customer segment to create the price schedule for the customer segment. The price schedule may be expressed as a series of percentages to be deducted from an item's full price or a fraction of the full price. In these embodiments, the same price schedule can be used for multiple items (e.g., purses and scarves) in a merchandise category (e.g., accessories) for which the price schedule was generated. The price schedule is transmitted to a pricing device 115 used by a retailer to assign prices to merchandise. The pricing device 115 includes a microprocessor and hardware and software (not shown) that support a network connection with the price schedule logic 110.

In one embodiment, the system 100 is a computing/data processing system including an application or collection of distributed applications for enterprise organizations. The applications and computing system 100 may be configured to operate with or be implemented as a cloud-based networking system, a "software as a service" (SaaS) architecture, or other type of networked computing solution. In one embodiment the price schedule logic 110 is a centralized server-side application that provides at least the functions disclosed herein and that is accessed by many users via computing devices/terminals (e.g. pricing device 115), communicating with the computing system 100 (functioning as the server) over a computer network.

Figure 2A:
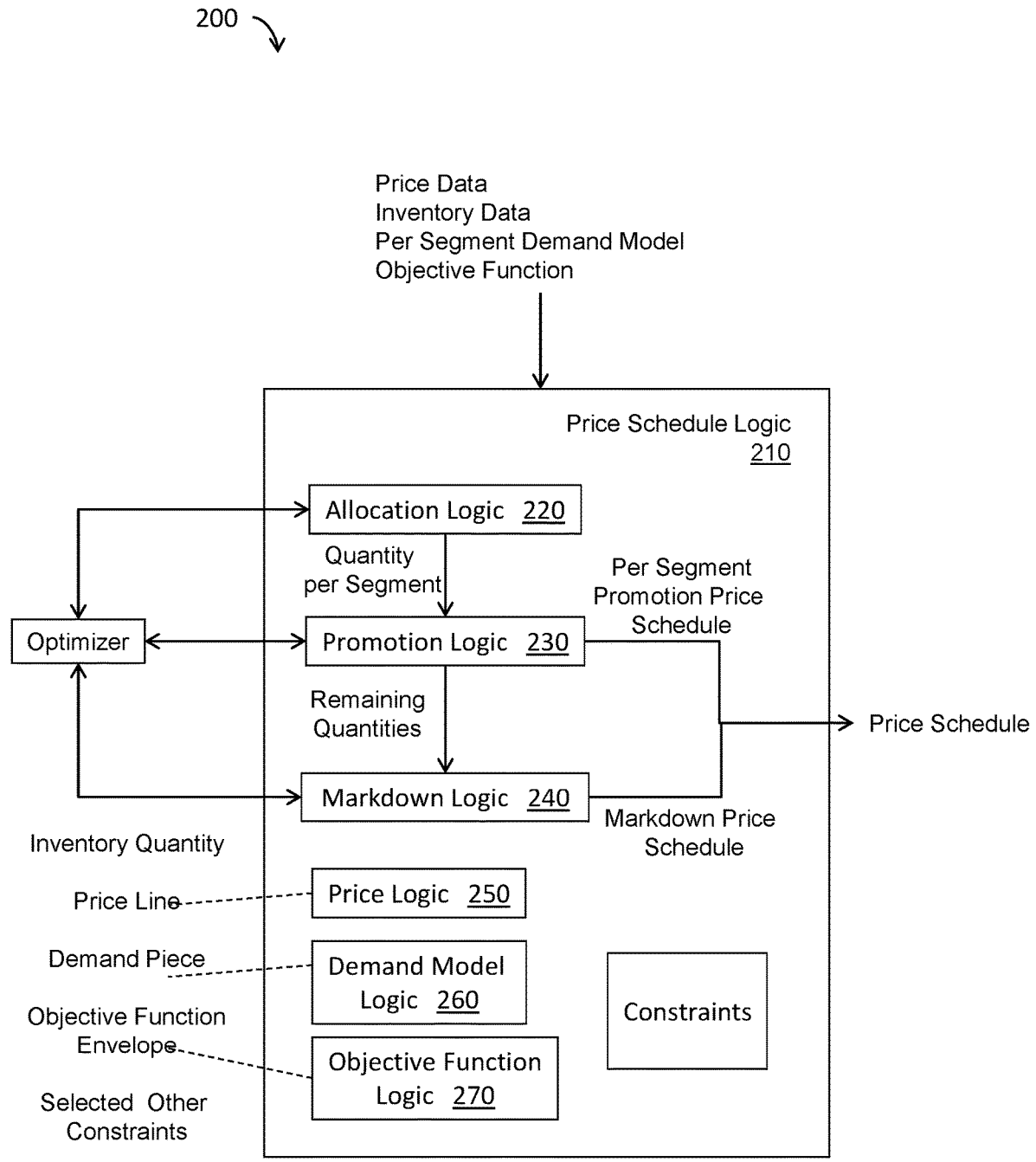
FIGS. 2A-2E illustrate other embodiments of a computerized system associated with promotion and markdown price scheduling.

FIG. 2A illustrates one embodiment of a computerized system 200 that generates a price schedule for a set of items. The system 200 includes price schedule logic 210 with an allocation logic 220, a promotion logic 230, and a markdown logic 240 that function in a manner analogous to that described for the allocation logic 120, the promotion logic 130, and the markdown logic 140 of FIG. 1. The price schedule logic 210 is configured to interact with an optimizer (e.g., a mixed integer linear programming (MILP) solver such as Gurobi) to generate the price schedule. A number of constraints that constrain various aspects of the price schedule according to business rules and other constraints generated by the price schedule logic 210 as described below are stored by the price schedule logic 210. Mathematical notations describing many example constraints are included in appendix A. These constraints will be referred to by a constraint number assigned to the constraint in the appendix.

Recall that the complexity of generating a price schedule using a per-segment demand model quickly becomes infeasible as the number of items increases. To make a solution using an MILP based optimizer feasible, the price schedule logic 210 includes a price logic 250, a demand model logic 260, and an objective function logic 270 that make simplifications to the price data, the per segment demand model, and the objective function, respectively, that are provided to the optimizer in the form of approximation constraints.

The price logic 250 is configured to generate a price line constraint that approximates the set of prices in a manner that allows the prices to be expressed as an integer variable. The demand logic 260 is configured to generate two or more linear demand pieces that approximate the demand function for a customer segment and to provide a selected one of the pieces as a demand piece constraint for each price value. The objective function logic 270 is configured to generate two or more linear envelopes that surround segments of the objective function and to provide a selected one of the envelopes as a set of linear envelope constraints associated with each price value.

The allocation logic 220, the promotion logic 230, and the markdown logic 240 are configured to provide the approximation constraints along with selected other constraints to the optimizer in a manner that will be described in more detail below, after the approximation constraints are explained in detail.

Figure 2B:
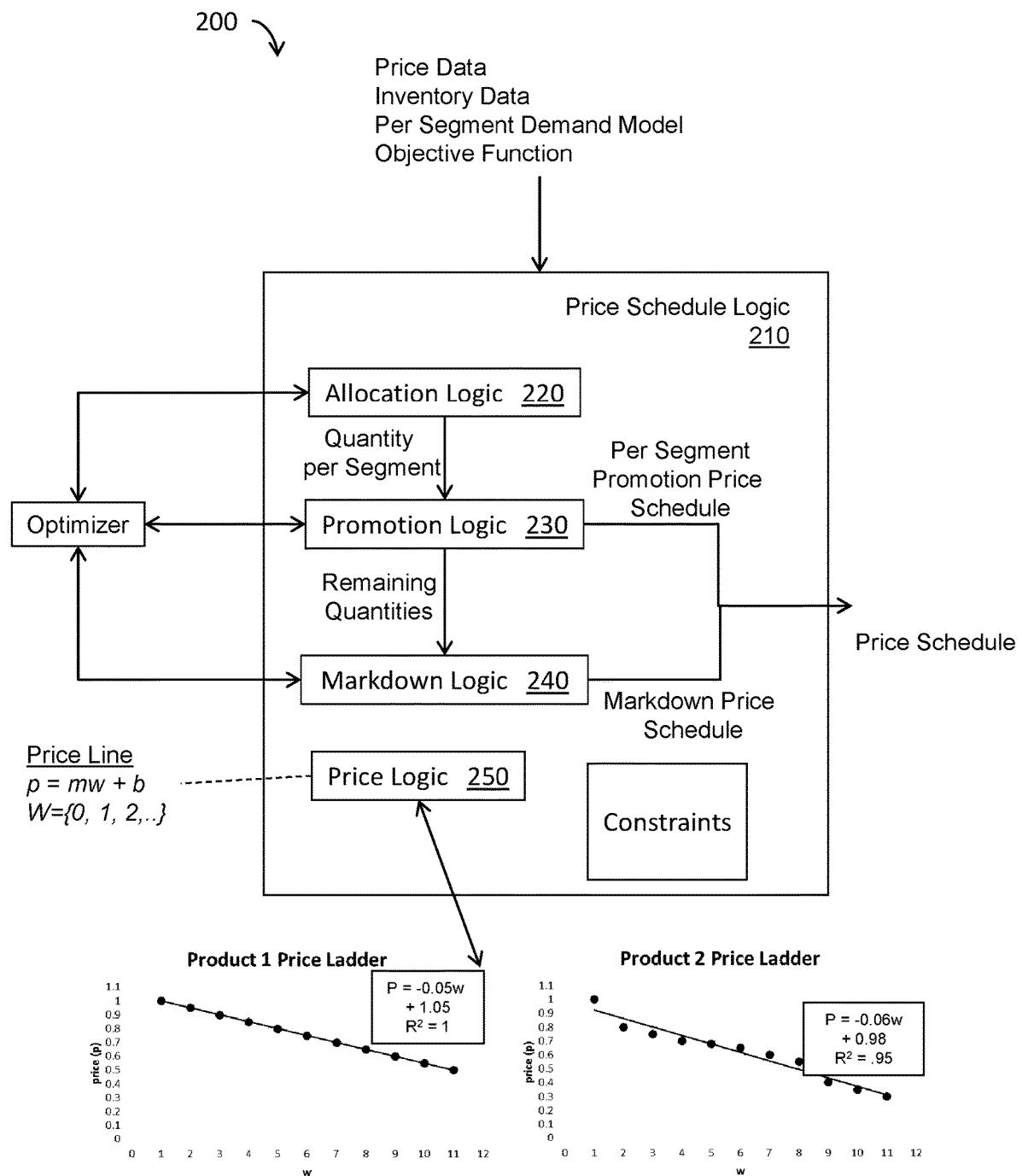

FIG. 2B illustrates how one embodiment of the price logic 250 generates the price line constraint that is used to approximate the set of prices for an item. Using the price line constraint recognizes that optimization problems with integer variables over a finite interval are typically simpler to handle than problems that include a "scaled" number of binary variables accounting for the same interval. If the prices in the set or prices or "price ladder" for an item are regularly spaced, the price ladder can be represented by a scaled integer variable. This feature is used to approximate the price ladder by a line given by position variable w, which is an integer. Prices in the line correspond to different values of w. In general, price ladders are discrete and not necessarily evenly spaced. However, the price line approximation produces acceptable results even when this is the case. Post optimization, a "true" price value from the price ladder that corresponds to the position variable w selected by the optimizer can be included in the price schedule and any other calculations.

To determine the line for a given price ladder, ordinary least squares (OLS) regression is performed on the prices, where each price, taken in order, is assigned a next value of w as shown in FIG. 2B. The price line constraint, also included as constraint C1 in the appendix can expressed mathematically as:

$$p_i^{t,seg} = \alpha_i^{t,seg} - \beta_i^{t,seg} w_i^{t,seg} \text{ where } w_i^{t,seg} = \{0,1,2,3 \ldots L_i\} \quad \text{EQ 1}$$

In equation 1, $p_i^{t,seg}$ is the price for item "i" in customer segment "seg" at time "t". To determine $\hat{\alpha}_i^{t,seg}$ and $\hat{\beta}_i^{t,seg}$ the OLS regression is performed for each product, customer segment, and time period during the regular season. During the clearance season, the OLS regression is performed for each product and time period. If the price ladder for an item is the same for all customer segments, and/or all time periods the number of OLS regressions is reduced accordingly. FIG. 2B shows two price ladders for two different products. The prices in the first price ladder are equally spaced and exactly define a line. The equation for that line can be seen to be p=−0.05 w+1.05. Likewise, the equation for the price line for the second price ladder can be seen to be p=−0.06 w+0.98. The price line for the item is provided to the optimizer by the allocation logic 120, the promotion logic 130, and the markdown logic 140.

Figure 2C:
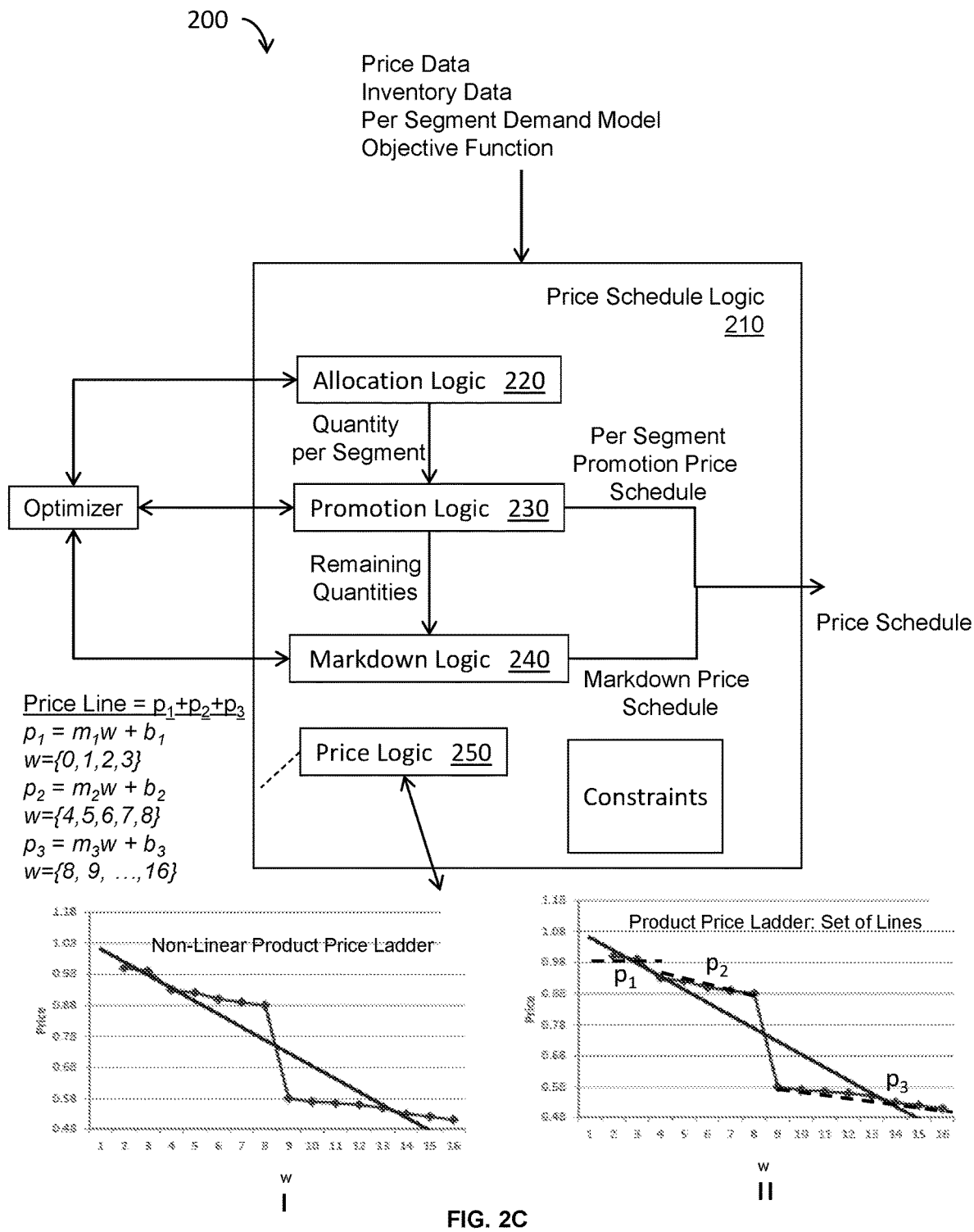

FIG. 2C illustrates how one embodiment of the price logic 250 generates a multi-piece price line constraint that is used to approximate the set of prices for an item when the price ladder for the item is not linear. It can be seen in the plot I that the prices for the item define three "buckets", a first bucket near full price, a slightly reduced price, and a significantly reduced price. A single line approximation (also shown in plot I) results in significant error with respect to actual prices. This error will be incorporated into the allocation stage, the promotion stage, and the markdown stage of the generation of the price schedule.

To address such nonlinear prices, in the embodiment shown in FIG. 2C, when the OLS regression indicates an error over a threshold, the price logic 250 analyzes the series of prices to detect "kinks", or points at which significant changes occur between a given price and an adjacent price. In one embodiment, the price logic 250 computes slopes between each pair of prices in the series and when a significant change in slope is detected, the series of prices is "broken" at the price at which the change occurs. OLS is then performed on the prices before the given price to create a first line and OLS is performed on the prices after the given price to create a second line. This process is continued until the error for each line is less than the threshold. Expressions for the resulting set of lines (each associated with a range of index values) are provided to the optimizer by the allocation logic 120, the promotion logic 130, and the markdown logic 140 as the "price line constraint" for the item. Referring to plot II in FIG. 2C, it can be seen that three line pieces $p_1$, $p_2$, and $p_3$ are created for the promotion prices of the item, resulting in a significantly better fit.

Figure 2D:
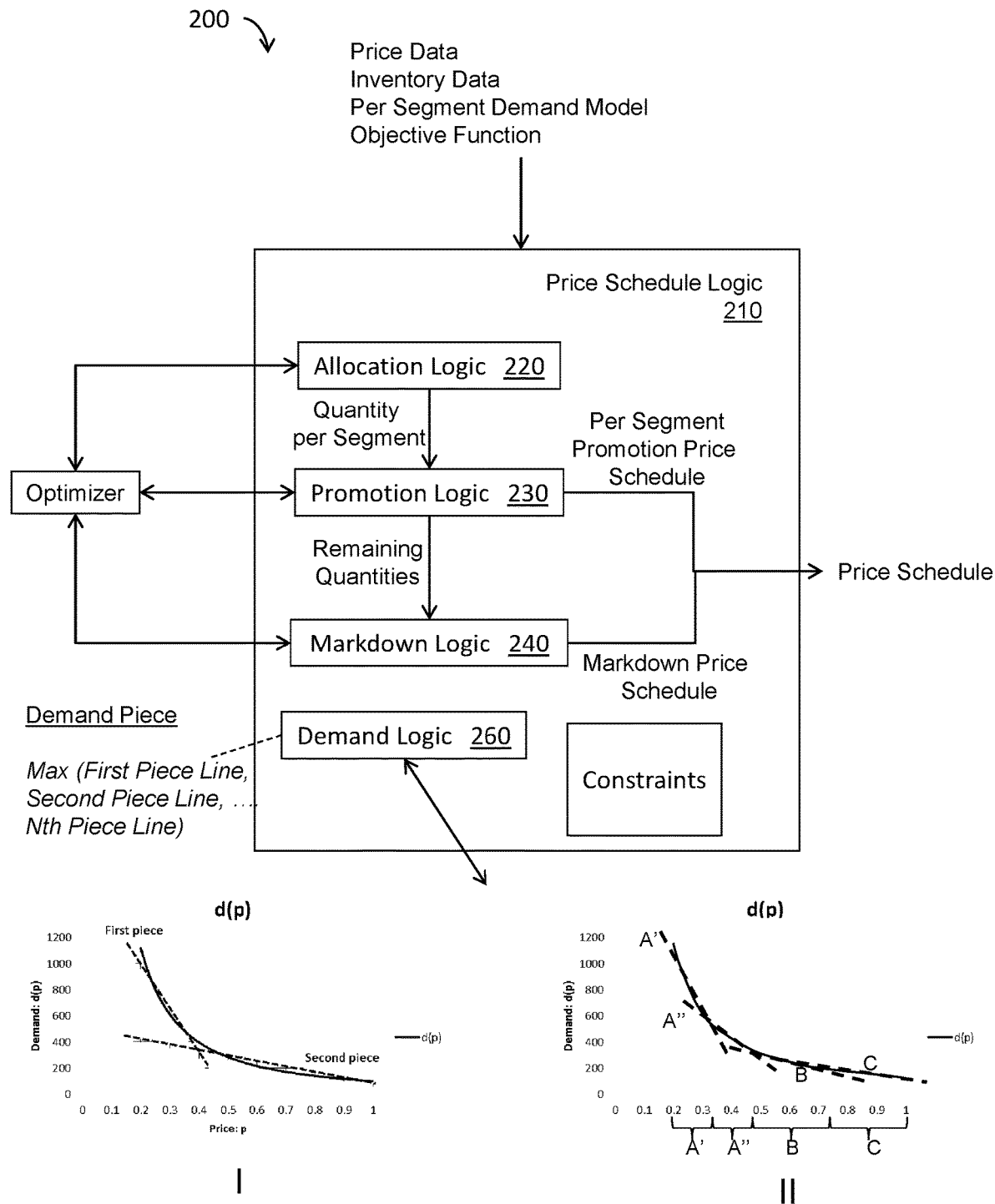

FIG. 2D illustrates how one embodiment of the demand logic 260 determines the demand piece constraint that is a linear approximation of the per-segment demand model provided to the optimizer. In one embodiment, the demand logic 260 is configured to approximate the per-segment demand model over two linear pieces. A mathematical expression of one approximate demand model that includes two linear pieces is:

$$d_i^{t,seg}(p_i^{t,seg}) \approx B_i^{t,seg} * SEA_i^{t,seg} * \max(\overline{m}_i^{t,seg} p_i^{t,seg} + \overline{c}_i^{t,seg}, \hat{m}_i^{t,seg} p_i^{t,seg} + \hat{c}_i^{t,seg}) \quad \text{EQ 2}$$

In equation 2, $d_i^{t,seg}$ is the demand for item "i" in customer segment "seg" at time "t", $B_i^{t,seg}$ is the base demand for item "i" in customer segment "seg" at time "t", $SEA_i^{t,seg}$ is the base seasonality of item "i" in customer segment "seg" at time "t", $\overline{m}_i^{t,seg}$ and $\hat{m}_i^{t,seg}$ are the slope of the first demand piece and second demand piece, respectively, of item "i" in customer segment "seg" at time "t", and $\overline{c}_i^{t,seg}$ and $\hat{c}_i^{t,seg}$ are the y intercept of the first demand piece and second demand piece, respectively, of item "i" in customer segment "seg" at time "t".

To determine the slope and y intercepts of the first and second demand pieces in the regular season, OLS regression is run on demand values as determined given the different prices in the price ladder for each product, customer segment, and time period in the regular season. The resulting demand pieces are per-segment demand pieces used to generate promotion prices.

During the clearance season, the demand values for the different segments are aggregated in each time period and the OLS regression of the aggregated demand is performed for each product and time period. The resulting demand pieces are aggregate demand pieces used to generate markdown prices.

Mathematically, for any given price point, the demand logic 260 selects the demand piece constraint that yields the higher demand. This is why equation 2 includes the "max" function. Constraint C8 describes, mathematically, one embodiment of the demand piece constraint.

Plot I in FIG. 2D shows a two-piece linear demand approximation. In one embodiment, the demand logic 260 is configured to approximate the demand model over more than two pieces when the error of the two-piece demand approximation exceeds some threshold (e.g., a gamma value above some threshold). If the error is above the threshold, the demand model is broken into three regions corresponding to an even division of prices as shown by the regions A'+A", B, and C in plot II. For each region, a line is fitted to the demand model and the error is calculated. It can be seen in plot II that the error of the lines in regions B and C is low, while the error of a line that fits all of region A would be higher. If the fit for the line in any region is above the threshold, the line is broken at the point of worst error and two lines are computed, one for the region before the break point price and one for the region after the break point price. It can be seen in plot II that the region A has been broken into two regions A' and A". This process is repeated until the error becomes small enough. The demand model logic 260 then selects the line that yields the highest demand at each price point as described above.

Figure 2E:
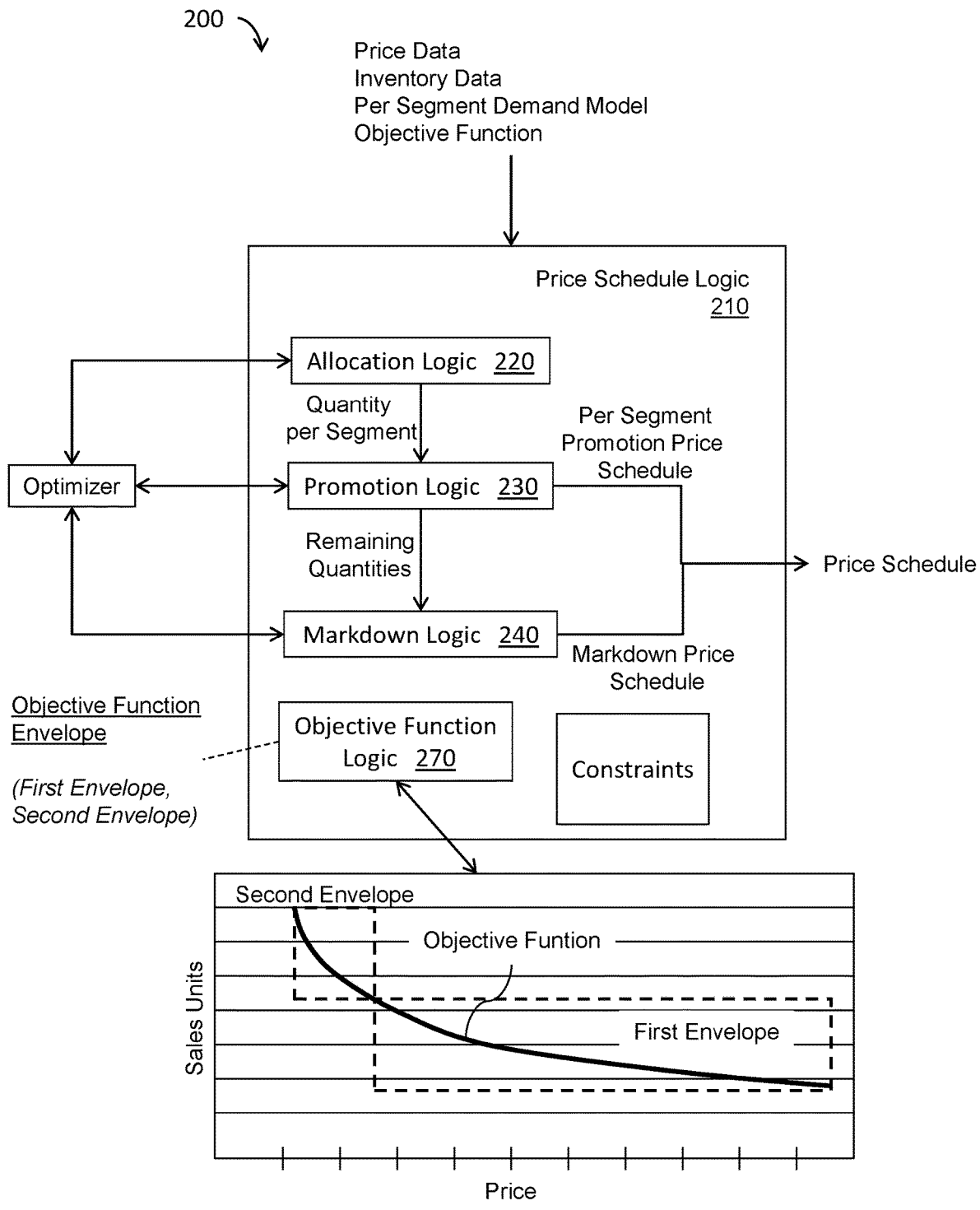

FIG. 2E illustrates how one embodiment of the objective function logic 270 determines the envelope constraints that approximate the objective function. The objective function is typically non-linear and also non-convex. However, in light of the fact that the objective function's terms are bilinear, the objective function logic 270 may use the McCormick relaxation technique to approximate the objective function using a series of linear envelopes. In one embodiment, two envelopes are used. The objective function shown in FIG. 2E is revenue, however, the profits objective function can be handled by including appropriate linear terms. The objective function logic 270 calculates the following parameters, which are used to generate two sets of envelope constraints, where the objective function is split at the point at which half the sales occur on either side of the point:

$P_{L,i}^{t,seg}$

Min. price point in the price ladder for product i at time t in segment seg.

$P_{U,i}^{t,seg}$

Max. price point in the price ladder for product i at time t in segment seg $Y_{MAX,i}^{t,seg} = d_i^{t,seg}(P_{L,i}^{t,seg})$ Max. Sales for product i at time t in segment seg $Y_{MIN,i}^{t,seg} = \min(0, d_i^{t,seg}(P_{U,i}^{t,seg}))$ Min. Sales for product i at time t in segment seg $Y_{L,i}^{1,t,seg} = Y_{MIN,i}^{t,seg}$ Min. Sales for first envelope for product i at time t in segment seg $Y_{U,i}^{1,t,seg} = 0.5(Y_{MIN,i}^{t,seg} + Y_{MAX,i}^{t,seg})$ Max. Sales for first envelope for product i at time t in segment seg $Y_{L,i}^{2,t,seg} = 0.5(Y_{MIN,i}^{t,seg} + Y_{MAX,i}^{t,seg})$ Min. Sales for second envelope for product i at time t in segment seg $Y_{U,i}^{2,t,seg} = Y_{MAX,i}^{t,seg}$ Max. Sales for second envelope for product i at time t in segment seg The calculated (price, sales points) are used to define the envelopes as shown in FIG. 2E. The approximate objective function derived by the objective function logic 270, expressed in terms of the objective function envelope constraints, is shown in mathematical terms in constraint C9.

Returning to FIG. 2A, the multi-stage process utilized by the price schedule logic 210 to generate the price schedule for an item will now be described. Recall that the allocation logic 220 allocates the inventory quantity amongst the customer segments based on a predicted contribution of each customer segment to the objective function (e.g., revenue). The allocation logic 220 uses the optimizer to predict the contributions of each segment as follows. The allocation logic 240 allocates the entire inventory quantity (including initial inventory and, in some embodiments, any replenishment) to each segment. The allocation logic 240 modifies an "inventory conservation" constraint (C6) as follows using segment-wise inventory and replenishment variables:

$$\forall i \in \mathbb{P}, t \in \mathbb{T}, t \geq 2 : I_i^{t,seg} = I_i^{t-1,seg} + sup_i^{t,seg} - y_i^{t,seg} \quad \text{EQ 3}$$

In Equation 4, $\mathbb{P}$ is the set of items, $\mathbb{T}$ is the set of time periods in entire season, $I_i^{t,seg}$ is the inventory of item "i" in customer segment "seg" at the beginning of time period "t" (i.e., the entire inventory quantity for the item), $sup_i^{t,seg}$ is the replenishment of item "i" in customer segment "seg" at the beginning of time period "t" (i.e., the entirety of replenishments for the item), and $y_i^{t,seg}$ is the sales of item "i" in customer segment "seg" during time period "t".

The allocation logic 220 adjusts a "markdown price change limit" constraint C4 using segment-wise variables as follows:

$$\forall i \in \mathbb{P}, seg \in \mathbb{S}: \sum_{t=1}^{T_R} x_i^{t,seg} \leq MPROMS_i \text{ and } \forall i \in \mathbb{P},$$ EQ 4

$$t \in \mathbb{T}_C: \sum_{i=1}^{N} x_i^{t,seg} \leq MPRODS_t$$

In Equation 5, S is the set of customer segments, $T_R$ is the set of time periods in the regular season, $MPRODS_t$ is the number of products that can be marked down in time period "t", $x_i^{t,seg}$ is one when there is a price change for item "i" in customer segment "seg" at time "t", $MPROMS_i$ is the number of times an item "i" can be marked down during the time periods in the clearance season, and $y_i^{t,seg}$ is the sales of item "i" in customer segment "seg" during time period "t", and $\mathbb{T}_C$ is the set of time periods in the clearance season.

The allocation logic 220 feeds the full inventory quantity allocated to each segment, the modified "inventory conservation" constraint C6, the modified "markdown price change limits" constraint C4, the price line constraint C1, the demand piece constraint C8, the objective function envelope constraint C9, and the constraints C2, C3, and C7 to the optimizer. Note that, in one embodiment, the allocation logic 220 does not include a sell-through constraint C5 in the problem formulation used to allocate the inventory. The sell-through constraint specifies a certain amount of inventory that is to be sold during the entire selling season (e.g., 90%). Dropping this constraint reduces the chance that the optimizer will be unable to solve for an optimal objective function.

The optimizer obtains an optimal objective function $Z^*_{seg}$ for each customer segment based on this full allocation of inventory to the customer segment and transmits the optimal objective function for each customer segment to the allocation logic 220. The allocation logic 220 calculates an inventory allocation ratio $r_{seg}$ for each customer segment as follows:

$$r_{seg} = \frac{Z^*_{seg}}{\sum_{s' \in \mathbb{S}} Z^*_{s'}}$$ EQ 5

The allocation logic 220 then allocates the inventory quantity (including replenishment, if any) to each customer segment according to its inventory allocation ratio.

Due to its complexity, the allocation process just described may be performed on a broader category of items, like accessories. The allocation logic 220 applies the resulting category allocation to all items in the category (e.g., purses, scarves, and so on). In one embodiment, the allocation logic 220 performs a streamlined allocation process that makes it more feasible to allocate on a per item basis. The streamlined allocation process may be performed for every product, resulting in more granular allocation. To perform the streamlined allocation process, the allocation logic 220 compiles a simplified version of the optimization problem that includes just a few constraints.

The objective function is selected by the allocation logic 220 to be maximization of revenue. The allocation logic 220 selects two promotional prices and one markdown price from the item's price data thereby limiting the number of prices that are considered by the optimizer. One additional constraint is that total demand be less than or equal to total inventory for the item. The allocation logic 220 provides this simplified version of the optimization problem to the optimizer, which returns the revenue for each segment that results if all inventory is allocated to the segment. The allocation logic 220 then allocates the particular item according to ratio of each segment revenue to a total of all segment revenues.

The promotion logic 230 is configured to generate the promotion portion of the price schedule. For each customer segment, the promotion logic 230 modifies the "inventory conservation" constraint C6 to handle only a single customer segment as follows:

$$\forall i \in \mathbb{P}, t \in \mathbb{T} - \{1\}: I_i^{t,seg} = I_i^{t-1,seg} + sup_i^{t,seg} - y_i^{t,seg}$$ EQ 6

The promotion logic 230 modifies the "sell-through" constraint C5 for each segment as follows:

$$\forall i \in \mathbb{P}, t \in \mathbb{T}: I_i^{t,seg} - y_i^{t,seg} \leq (1 - ST_i^t) I_i^{1,seg}$$ EQ 7

In Equation 8, $ST_i^t$ is the sell-through target for product i at end of time-period t.

For each customer segment, the promotion logic 230 feeds the inventory quantity allocated to the segment, the modified "inventory conservation" constraint C6, the modified "sell-through" constraint C5, the price line constraint C1, the per-segment demand piece constraint C8, the objective function envelope constraint C9, and the constraints C2, C3, C6, and C7 to the optimizer. In one embodiment, additional constraints that reflect business rules (see Constraints section below) are provided to the optimizer. The optimizer obtains an optimal objective function $Z^*_{seg}$ for each customer segment based on optimal promotion prices $p\_opt_i^{t,seg}$ expressed as position variables $w_i^{t,seg}$ for each price in the time periods in the regular season. The promotion logic 230 is configured to select, from the "true" price ladder for the item, the promotion price value $p_i^{t,seg}$ that corresponds to the selected position variable $w_i^{t,seg}$. An example is shown below:

| $w_i^{t,seg}$ (position variable) | $p_i^{t,seg}$ (approx. price ladder) | $p\_opt_i^{t,seg}$ (true price ladder) |
|---|---|---|
| 0 | 1.00 | 1.00 |
| 1 | 0.90 | 0.90 |
| 2 | 0.79 | ➡ 0.80 |
| 3 | 0.77 | 0.78 |
| 5 | 0.67 | 0.65 |

When the optimizer returns the position variable value of 2, which corresponds to price 0.79 on the price line, the promotion logic selects the "true" price of 0.80 that is associated with the position variable 2. The selected prices for each time period in the regular season make up the promotion portion of the price schedule.

The markdown logic 240 is configured to generate the markdown portion of the price schedule. The markdown logic 240 drops all regular season time periods because the item is being priced for the clearance season.

$$\mathbb{T}_R = \phi; \mathbb{T} = \mathbb{T}_C. \text{ This means that } 1 \leq t \leq T_C$$ EQ 8

The markdown logic calculates the aggregated inventory quantity for all customer segments as:

$$I_i^1 = \Sigma_{seg \in \mathbb{S}} I_i^{T_R+1,seg}$$ EQ 9

The markdown logic 240 feeds the aggregated inventory quantity, the price line constraint C1, the aggregated demand piece constraint C8, the objective function envelope constraint C9, and the constraints C2-C7 to the optimizer. In one embodiment, additional constraints that reflect business rules (see Constraints section below) are provided to the optimizer.

The optimizer obtains an optimal objective function based on optimal markdown prices pm_opt$_i^t$ expressed as position variables w for each price in the clearance season time periods. The markdown logic 240 is configured to select, from the "true" price ladder for the item, the markdown price value that corresponds to the selected position variable as described above. The selected prices for each time period in the clearance season make up the markdown portion of the price schedule. The price schedule logic 210 is configured to combine the promotion portion with the markdown portion to generate the price schedule that is transmitted to the retailer.

Figure 3:
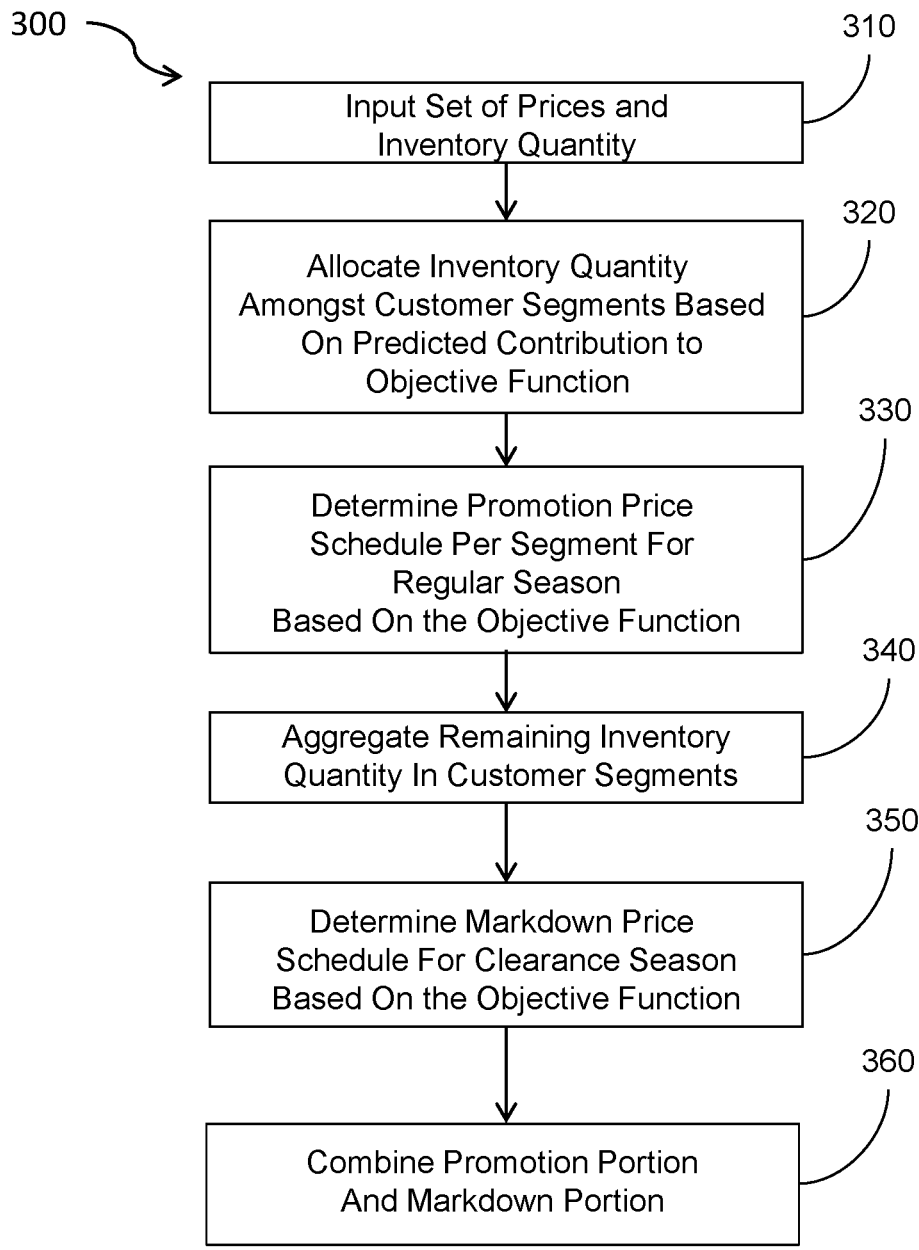
FIG. 3 illustrates one embodiment of a method associated with promotion and markdown price scheduling.

FIG. 3 illustrates one embodiment of a method 300 associated with to determining a price schedule for each item in a group of items. At 310, a set of prices for the item, an inventory quantity for the item, a per-segment demand model for the item, and an objective function that is a function of the per-segment demand model are input. This step may be performed by the price schedule logic 110 or 210 of FIGS. 1 and 2A-2E. In one embodiment, the data corresponding to the set of prices is stored in records in a database table or other database structure that can be queried by the price schedule logic 110. In one embodiment, data describing the set of prices and inventory quantity are stored in registers or memory addresses, the contents of which may be read, input, or transferred into the working memory of the price schedule logic 110. In one embodiment, data structures encoding the per-segment demand model and a selected objective function are received by way of an electronic communication from a retailer that is parsed to identify the data structures.

At 320, the method includes allocating the inventory quantity amongst a plurality of customer segments based at least on a predicted contribution of each customer segment to the objective function. This step may be performed by the allocation logic 120 or 220 of FIGS. 1 and 2A-2E. A processor is controlled by the allocation logic 110 or 220 to allocate the inventory quantity as described above with respect to FIG. 2A (see also FIG. 6).

For each customer segment, based at least on a quantity of inventory allocated to the customer segment, a promotion portion of the price schedule that maximizes the objective function is determined at 330. The promotion portion assigns to the item a series of prices selected from the set of prices for respective time periods during a regular season for the item. This step may be performed by the promotion logic 240 of FIGS. 1 and 2A-2E. A processor is controlled by the promotion logic 240 to create the promotion portion of the price schedule as described above with respect to FIG. 2A (see also FIG. 6).

At 340 the method includes aggregating a quantity of remaining inventory allocated to the plurality of customer segments at an end of the regular season. This step may be performed by the markdown logic 250 of FIGS. 1 and 2A-2E. A processor is controlled by the markdown logic 250 aggregate the remaining inventory (see FIG. 6).

At 350, based at least on the aggregated inventory, a markdown portion of the price schedule for the item that maximizes the objective function is determined. The markdown portion assigns a series of prices selected from the set of prices for respective time periods during a clearance season for the item. This step may be performed by the markdown logic 250 of FIGS. 1 and 2A-2E. A processor is controlled by the markdown logic 250 to create the markdown portion of the price schedule as described above with respect to FIG. 2A (see also FIG. 6).

The promotion portion and the markdown portion are combined to create a price schedule for the item at 360. This step may be performed by the price schedule logic 110 or 210 of FIGS. 1 and 2A-2E. A processor is controlled by the price schedule logic 110 or 210 to combine the promotion portion and the markdown portion (see FIG. 4).

In one embodiment, an electronic communication that includes the price schedule is transmitted, by way of a network or internet connection, to a pricing device (115 in FIG. 1) of the retailer. In one embodiment, the price schedule causes the computing device of the retailer to modify/adjust prices of items in data records of an inventory/pricing database according to the price schedule. The modified/adjusted prices provide a pricing solution to improve the selected objective function in a manner that observes the selected constraints.

In one embodiment, the method 300 includes allocating the inventory quantity amongst customer segments by performing the following steps for each customer segment: allocating an entirety of the inventory quantity to the customer segment; transmitting the entirety of the inventory quantity, the set of prices, an approximate per-segment demand model, a first set of constraints, and an approximate objective function to an optimizer; receiving, from the optimizer, a per segment value of the approximate objective function for the customer segment; computing a ratio of the per segment value to a sum of all per segment values for the customer segments; and allocating the inventory amongst the customer segments according to the ratio for each customer segment. These steps may be performed by the allocation logic 220 of FIG. 2A controlling a processor (see FIG. 6).

In one embodiment, the method 300 includes determining the promotion portion for each customer segment by performing the following steps: providing the set of prices, the inventory quantity allocated to the customer segment, the approximate per-segment demand model, a second set of constraints, and the approximate objective function to the optimizer; and receiving, from the optimizer, a promotion portion for each customer segment that optimizes the objective function. These steps may be performed by the promotion logic 230 of FIG. 2A controlling a processor (see FIG. 6).

In one embodiment, the method 300 includes determining the markdown portion by performing the following steps: providing the set of prices, the aggregated inventory, an approximate aggregate demand model for the item, a third set of constraints, and the approximate objective function to the optimizer; and receiving, from the optimizer, a markdown portion that optimizes the objective function. These steps may be performed by the markdown logic 240 of FIG. 2A controlling a processor (see FIG. 6).

In one embodiment, the method 300 includes calculating a line corresponding to a linear approximation of the set of prices, where the line is a function of a position variable that evenly divides the line into segments between a maximum price and a minimum price, where each integer value of the position variable is associated with a price in the set of prices. These steps may be performed by the price logic 250 of FIG. 2B or 2C controlling a processor (see FIG. 6). An expression of the line is provided to the optimizer as the set of prices for the item; an integer value for the position variable that corresponds to a selected price is received from the optimizer; a price in the set of prices is identified that corresponds to the position variable; and the identified price is included in the price schedule for the item. These steps may be performed by the allocation logic 220, the promotion logic 230, or the markdown logic 240 of FIG. 2A controlling a processor (see FIG. 6).

In one embodiment, the method 300 includes determining the promotion portion for each customer segment by, for each time period, performing the following steps: calculating a set of customer segment demands for the item when the item is priced at respective prices in the set of prices; calculating a plurality of lines corresponding to a piecewise linear approximation of the set of customer segment demands; and for each price, selecting a line that corresponds to a highest demand at the price. These steps may be performed by the demand logic 260 of FIG. 2D controlling a processor (see FIG. 6). An expression for the selected line is provided to the optimizer as the approximate per-segment demand model for the price during the time period. This step may be performed by the allocation logic 220, the promotion logic 230, or the markdown logic 240 of FIG. 2A controlling a processor (see FIG. 6).

In one embodiment, the method 300 includes determining the markdown portion for the item by, for each time period, performing the following steps: for each customer segment, calculating a set of customer segment demands for the item when the item is priced at respective prices in the set of prices; calculating a set of respective aggregate demands by aggregating respective customer segment demands for each price; calculating a plurality of lines corresponding to a piecewise linear approximation of the set of aggregate demands; and for each price, select a line that corresponds to a highest demand at the price. These steps may be performed by the demand logic 260 of FIG. 2D controlling a processor (see FIG. 6). An expression for the selected line is provided to the optimizer as the approximate aggregate demand model for the price during the time period. This step may be performed by the allocation logic 220, the promotion logic 230, or the markdown logic 240 of FIG. 2A controlling a processor (see FIG. 6).

In one embodiment, the method 300 includes determining the approximate objective function by, for each time period, performing the following steps: based on at least on the approximate demand model for the time period, calculating sales for the item at prices in the set of prices; dividing the objective function into a plurality of segments based at least on the calculated sales; and for each segment of the objective function, determine a linear envelope that covers the segment. These steps may be performed by the objective function logic 270 of FIG. 2E controlling a processor (see FIG. 6). A set of constraints describing the linear envelopes is provided to the optimizer as the approximate objective function for the item during the time period. This step may be performed by the allocation logic 220, the promotion logic 230, or the markdown logic 240 of FIG. 2A controlling a processor (see FIG. 6).

Constraints

A user of the system 100 may selectively enable and specify several different business related constraints. These constraints will be provided to the optimizer by the allocation logic 220, the promotion logic 230, and the markdown logic 240. Example business related constraints will now be described. Of course, any number of other constraints on possible prices for items may be presented to the optimizer to constrain the optimizer's solution in accordance with a retailer's pricing policies.

A "self no-touch" constraint models the fact that two consecutive promotions of a specific item should be separated by a few time periods (e.g., minimum of two weeks between consecutive promotions). A retailer may choose to enable this constraint for certain (or all) items and, for each item, specify the minimum number of time periods between consecutive promotions. One possible mathematical formulation of the "self no-touch" constraint suitable for input to an MIP solver is presented in mathematical form as constraint C10 in appendix A.

A "cross no-touch" constraint models the fact that two consecutive promotions of any two different items should be separated by a few time periods (e.g., minimum of two weeks between consecutive promotions for yogurt of any brand). A retailer may choose to enable this constraint for certain (or all) sets of items and, for each set of items, specify the minimum number of time periods between consecutive promotions. One possible mathematical formulation of the "cross no-touch" constraint suitable for input to an MIP solver is presented in mathematical form as constraint C11 in appendix A.

Set constraints include "must-promote sets of items" and "cannot-promote sets of items." Items in a "must-promote set" must be promoted together. For example, if there are three products of a shampoo brand (e.g., shampoo, conditioner, and hair spray), a retailer may want to put all the three products on promotion at the same time. A retailer may choose to enable the must-promote set constraint for certain sets of items. Items in a "cannot-promote set" cannot be promoted together. For example, a retailer may not want to put a highly popular shampoo product and a low-seller shampoo product on promotion at the same time. A retailer may choose to enable the "cannot-promote set" constraint for certain sets of items. One possible mathematical formulation of the "must-promote set" constraint and the "cannot-promote set" constraint suitable for input to an MIP solver is presented in mathematical form as constraints C12 and C13, respectively, in appendix A.

Inter-item constraints can be used by a retailer to impose price restrictions that maintain the price order between two items. For example, a retailer may want to specify that the price of a national brand item should always be higher than a private label brand item. Another example would be to maintain the price relation between a 2-pack of 2-liter Coke bottles and a 4-pack of 2-liter Coke bottles. A retailer may choose to enable the inter-item constraints for certain sets of items. The retailer specifies the relationships between prices of items in the set that must be maintained. One possible mathematical formulation of the "cross no-touch" constraint suitable for input to an MIP solver is presented in mathematical form as constraint C14 in appendix A.

Price Scheduling Including Promotions During Clearance Season

When inventories are very large, sell-through targets may make it infeasible for the optimizer to determine a price schedule, even when the simplifications and approximations described above are performed prior to providing the problem to the optimizer. When a solution cannot be found by the optimizer for the problem as compiled above, it is an indication that promotional prices during the regular season and markdown prices during the clearance season are not sufficient to sell enough of the inventory to meet the sell-through target. In this case it may be desirable to provide additional promotional pricing on top of markdown prices during the clearance season. Typically, a retailer would not prefer to do promotional prices on marked down items, but when a solution is not found using the above techniques, consideration of selective promotional pricing on top of markdown prices during the clearance season may allow generation of a price schedule that meets the sell through targets, albeit possibly at the cost of reduced revenue for the retailer.

Figure 4:
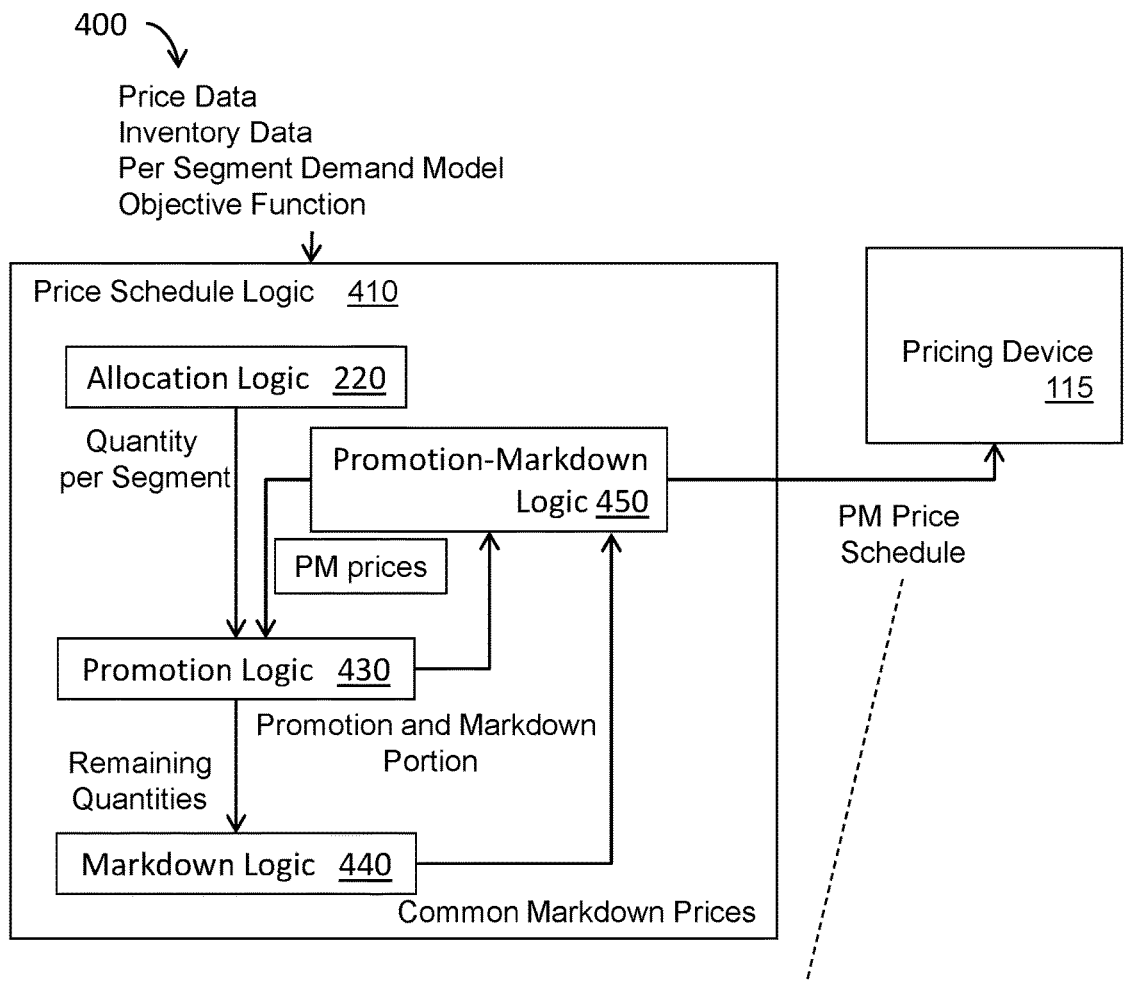
FIG. 4 illustrates one embodiment of a computerized system associated with promotion and markdown scheduling that includes promotions on markdown prices during the clearance season.

FIG. 4 illustrates one embodiment of computerized system 400 that generates a price schedule that includes promotional pricing on top of markdown prices during the clearance season. Example price schedules similar to those presented in FIG. 1 are shown in FIG. 4 with the promotional pricing during the clearance season in bold. It can be seen that the price schedule includes an additional 20% off the already marked down price (by 50%) that will be targeted to singles in the second time period (e.g., week) of the clearance season. The price schedule also includes an additional 30% off the already marked down price (by 60%) that will be targeted to moms in the third time period (e.g., week) of the clearance season. The system 400 functions in a manner similar to the system 100 of FIG. 1 with several modifications that will be described now.

The system 400 includes a price schedule logic 410 that includes the allocation logic 120, a promotion logic 430, a markdown logic 440, and a promotion-markdown logic 450 that cooperate to control a processor (not shown) to create the price schedule. The allocation logic 120 functions as described above with respect to FIG. 2A and, for simplicity sake, will not be explained again now. The promotion-markdown logic 450 performs several functions to enable generation of the promotion-markdown (PM) price schedule that is transmitted to the pricing device 115. The promotion-markdown logic 450 calculates promotion-markdown (PM) prices for the item using the price data. The PM prices are provided as price constraints to the optimizer by the promotion logic 430 for consideration during the clearance period. The PM prices are calculated by applying, to the item's markdown prices, promotional price rates that yielded the item's promotion prices.

For example, if an item has two promotional prices, a promotion price that results from a 10% promotion rate (which may also be expressed as "0.9" hereafter for ease of explanation) and a promotion price that results from a 15% promotion rate (0.85) as well as a single markdown price which results from a 50% markdown rate (0.50) the PM prices are calculated by the promotion-markdown logic 450 as follows. The promotion rate for each promotional price is applied to each markdown price to generate the PM prices, which in this example are: {(0.85)(0.50)=0.425, (0.90)(0.50)=0.45, (1.0)(0.5)=0.50}. Note that the PM price that results from no additional promotion is also included in the PM prices that will be considered by the optimizer during the clearance season.

The promotion logic 430 provides price constraints in the form of expressions of line pieces as described above with respect to FIGS. 2B and 2C to the optimizer. The price constraints correspond to the promotion prices for the item for the regular season and the PM prices for the clearance season. The approximate objective function, the approximate demand model, and the rest of the constraints described above with respect to FIG. 2A are provided to the optimizer by the promotion logic 430. The optimizer will return selected promotion prices for each customer segment in each time period in the regular season as well as selected PM prices for each customer segment in each time period in the clearance season. Thus, in this embodiment the promotion logic 430 outputs a promotion and markdown portion of the schedule as opposed to just the promotion portion that is output by the promotion logic 230 of FIG. 2A. The promotion and markdown portion is adjusted by the promotion-markdown logic 450 as follows prior to transmitting the PM price schedule to the pricing device 115.

The markdown logic 440 calculates the inventory remaining in each customer segment at the end of the regular season when the item is priced according to the promotion and markdown portion. The markdown logic 440 then calls on the optimizer to determine an aggregate markdown schedule for each customer segment with the additional price constraint that the markdown price must be the same for all segments in each time period. The markdown logic 440 provides the original markdown prices for the item (not the PM prices) to the optimizer. Thus, the optimizer will return an aggregate markdown portion for each customer segment in which a common markdown price is assigned to all customer segments in each time period.

The promotion-markdown logic 450 adjusts the PM prices for each customer segment in the promotion and markdown portion based on the common markdown prices generated by the markdown logic 440. For each PM price in a time period for a customer segment in the promotion and markdown portion, the closest PM price that resulted from applying a promotion rate to the common markdown price is substituted. The resulting adjusted promotion and markdown portion is provided as the PM price schedule to the pricing device 115. An example of the adjustment to the PM price in the original promotion and markdown portion will be described with respect to FIG. 5.

Figure 5:
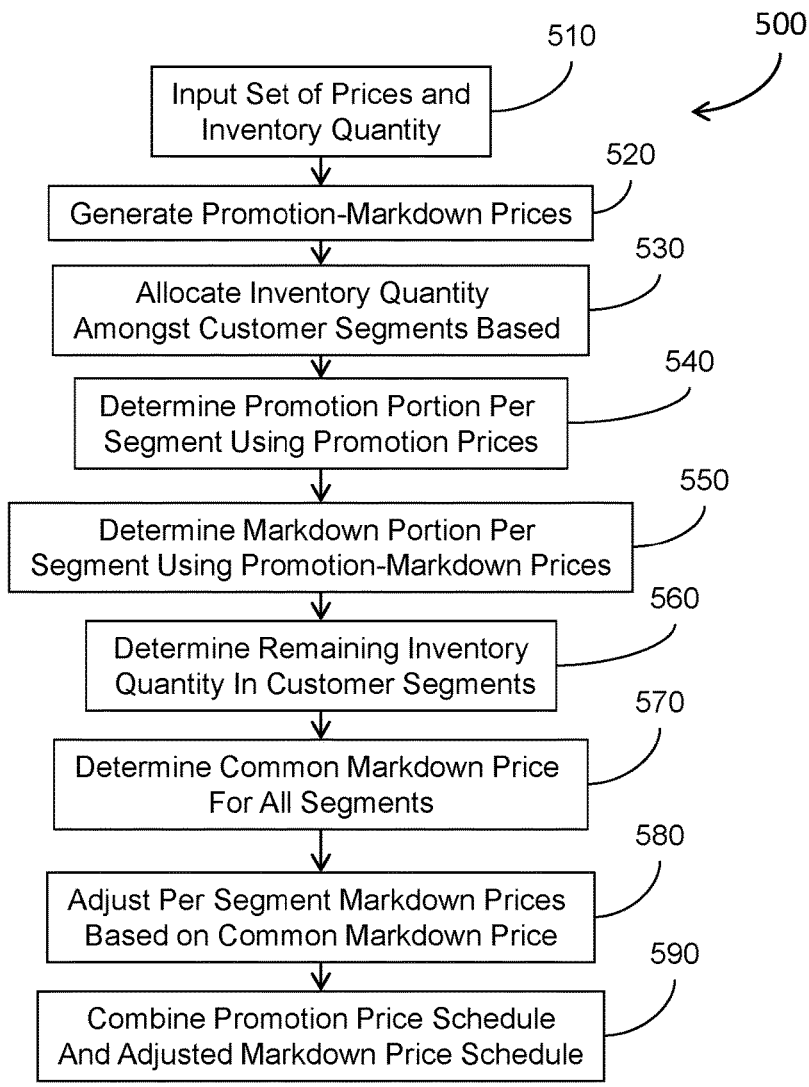
FIG. 5 illustrates one embodiment of a method associated with promotion and markdown scheduling that includes promotions on markdown prices during the clearance season.

FIG. 5 illustrates one embodiment of method 500 that determines a PM price schedule for an item that includes promotions applied to markdown prices during the clearance season. In one embodiment, the method 500 is performed when the method 300 fails to produce a result. In one embodiment, the method 500 is performed by the price schedule logic 410 and its logical components controlling a processor to perform the steps described with respect to FIG. 4.

At 510, a set of promotion prices for the item, a set of markdown prices for the item, an inventory quantity for the item, a per-segment demand model for the item, and an objective function that is a function of the per-segment demand model are input. This step may be performed by the price schedule logic 110, 210, or 410 of FIGS. 1, 2A-2E, and 4. In one embodiment, the data corresponding to the set of prices is stored in records in a database table or other database structure that can be queried by the price schedule logic 110, 210, or 410. In one embodiment, data describing the set of prices and inventory quantity are stored in registers or memory addresses, the contents of which may be read, input, or transferred into the working memory of the price schedule logic 110, 210, or 410. In one embodiment, data structures encoding the per-segment demand model and a selected objective function are received by way of an electronic communication from a retailer that is parsed to identify the data structures. The promotion prices and markdown prices for an example item are shown in table 595 in FIG. 5.

At 520, the method includes generating a set of promotion-markdown prices for the item by applying, to each markdown price, respective promotion rates that resulted in the respective promotion prices. This step may be performed by the promotion-markdown logic 450 of FIG. 4. A processor is controlled by the promotion-markdown logic 450 to generate a set of promotion-markdown prices as described above with respect to FIG. 4 (see also FIG. 6). PM prices for the example item are shown in table 595, and after sorting, include {(0.7)(0.6)=0.42, (0.75)(0.6)=0.45, (0.7)(0.65)=0.455, ..., (1.0)(0.7)=0.7}.

At 530, the inventory quantity is allocated amongst a plurality of customer segments based at least on a predicted contribution of each customer segment to the objective function. This step may be performed by the allocation logic 120 or 220 of FIG. 1, 2A-2E, or 4. A processor is controlled by the allocation logic 110 or 220 allocate the inventory quantity as described above with respect to FIG. 2A (see also FIG. 6). This step may be performed by controlling a processor to formulate and provide an optimization problem to an optimizer as described with reference to FIG. 2A.

For each customer segment, based at least on a quantity of inventory allocated to the customer segment, a promotion portion of the price schedule that maximizes the objective function is determined at 540, where the promotion portion comprises a series of prices selected from the set of promotion prices for respective time periods during a regular season for the item. This step may be performed by the promotion logic 230 or 430 of FIG. 1, 2A-2E, or 4. A processor is controlled by the promotion logic 230 or 440 to create the promotion portion of the price schedule as described above with respect to FIG. 2A or 4 (see also FIG. 6).

At 550, for each customer segment, based at least on quantity of inventory allocated to the customer segment remaining at an end of the regular season, a markdown portion of the price schedule for the item that maximizes the objective function is determined. The markdown portion comprises series of prices selected from the set of promotion-markdown prices for respective time periods during a clearance season for the item. This step may be performed by the promotion logic 230 or 430 of FIGS. 1, 2A-2E, and 4. A processor is controlled by the promotion logic 230 or 440 to create the promotion portion of the price schedule as described above with respect to FIG. 2A or 4 (see also FIG. 6). The PM price for the example item for a given customer segment and a given clearance season time period is shown in table 595 as 0.42. The promotion portion and the markdown portion may be combined and provided to a pricing device 115 for use in pricing the item.

In the illustrated embodiment, the method includes, at 560, determining a remaining inventory quantity for each customer segment at the end of the regular season. This step may be performed by the markdown logic 440 of FIG. 4. A processor is controlled by the markdown logic 440 to determine the remaining inventory (see also FIG. 6).

At 570, the method includes determining a common markdown price for all customer segments in each time period in the clearance season by: providing the set of promotion prices, the set of markdown prices, the inventory quantities, the approximate per-segment demand model, a common markdown constraint that specifies that markdown prices must be the same across all customer segments in each time period, and the approximate objective function to the optimizer. An aggregate markdown portion comprising a series of common markdown prices for all customer segments in respective time periods that optimizes the objective function is received from the optimizer. This step may be performed by the markdown logic 440 of FIG. 4. A processor is controlled by the markdown logic 440 to create the markdown portion of the price schedule with common markdown prices as described above with respect to FIG. 4 (see also FIG. 6). The common markdown price for the example item for all customer segments and the given clearance season time period is shown in table 595 as 0.65.

At 580, each PM price in the markdown portion for the customer segment is adjusted based at least on the common markdown price. This step may be performed by the promotion-markdown logic 450 of FIG. 4. A processor is controlled by the promotion-markdown logic 450 to adjust a PM price for a customer segment in a clearance time period as described above with respect to FIG. 4 (see also FIG. 6). The adjusted PM price for the example item in the given customer segment and the given time period is shown as 0.455 in FIG. 5.

At 590, the method includes combining the promotion portion and the adjusted markdown portion to create the price schedule for the item. This step may be performed by the promotion-markdown logic 450 of FIG. 4. A processor is controlled by the promotion-markdown logic 450 to combine the promotion portion of the promotion markdown portion with the adjusted PM prices in the markdown portion of the promotion markdown portion to create the PM price schedule as described in FIG. 4 (see also FIG. 6).

In one embodiment, an electronic communication that includes the PM price schedule is transmitted, by way of a network or internet connection, to a pricing device (115 in FIGS. 1 and 4) of the retailer. In one embodiment, the price schedule causes the computing device of the retailer to modify/adjust prices of items in data records of an inventory/pricing database according to the price schedule. The modified/adjusted prices provide a pricing solution to improve the selected objective function in a manner that observes the selected constraints.

In one embodiment, the PM prices are adjusted by, for each time period: identifying a promotion-markdown price in the set of promotion-markdown prices that i) resulted from applying a promotion rate to the common markdown price and ii) is closest to the promotion-markdown price received from the optimizer for the customer segment; and replacing the promotion-markdown price received from the optimizer with the identified promotion-markdown price. This step may be performed by the promotion-markdown logic 450 of FIG. 4. A processor is controlled by the promotion-markdown logic 450 to adjust PM prices in the markdown portion of the promotion markdown portion as described in FIG. 4 (see also FIG. 6).

In table 595 it can be seen that the PM price selected by the optimizer for the example item is 0.42. This PM price cannot be generated by applying a promotion rate (rates are shown in top row of table 595) for the item to the common markdown price for the item, which is 0.65. Thus, the closest PM price that resulted from a promotion rate applied to 0.65, or the PM price 0.455 is selected. Recall that PM price 0.455 resulted from the promotion rate (0.7) being applied to the markdown price (0.65). In the final PM price schedule, 0.455 replaces 0.42 for the item in the given customer segment in the given time period.

In one embodiment, the method 500 includes allocating the inventory quantity amongst customer segments by, for each customer segment: allocating an entirety of the inventory quantity to the customer segment; transmitting, to an optimizer, the entirety of the inventory quantity, a subset of the promotion prices and a subset of the markdown prices, an approximate per-segment demand model, and an approximate objective function; and receiving, from the optimizer, a per segment value of the approximate objective function for the customer segment. A ratio of the per segment value to a sum of all per segment values is computed for the customer segments and the inventory is allocated amongst the customer segments according to the ratio for each customer segment. These steps may be performed by the allocation logic 220 of FIG. 2A controlling a processor (see FIG. 6).

In one embodiment, the method 500 includes creating the price schedule for each customer segment by: providing the set of promotion prices, the set of promotion-markdown prices, the inventory quantity allocated to the customer segment, an approximate per-segment demand model, and an approximate objective function to the optimizer; and receiving, from the optimizer, a promotion portion for each customer segment that optimizes the objective function and a markdown portion for each customer segment that optimizes the objective function. These steps may be performed by the promotion logic 430 of FIG. 4 controlling a processor (see FIG. 6).

In one embodiment, the method 500 includes calculating a line corresponding to a linear approximation of the set of promotion prices, where the line is a function of a position variable that evenly divides the line into segments between a maximum price and a minimum price, where each integer value of the position variable is associated with a price in the set of prices and calculating an error between the line and the set of promotion prices. Until the error is less than a threshold: an integer value at which the error is highest is identified and the line is broken into a first line and a second line. The first line is a linear approximation of a first subset of promotion prices that precede the identified integer value and the second line is a linear approximation of a second subset of promotion prices that succeed the identified integer value. A set of expressions for respective lines as associated with respective integer values is provided to the optimizer as the set of promotion prices for the item. The method includes receiving, from the optimizer, an integer value for the position variable that corresponds to a selected promotion price; identifying a price in the set of promotion prices that corresponds to the position variable; and including the identified price in the price schedule for the item. These steps may be performed by the allocation logic 220, the promotion logic 230 or 430, or the markdown logic 240 or 440 of FIGS. 2A and 4 controlling a processor (see FIG. 6).

In one embodiment, the method 500 includes determining the promotion portion and the markdown portion for each customer segment by, for each time period, calculating a set of customer segment demands for the item when the item is priced at respective prices in the set of prices, further where there are n prices in the set of prices; calculating two lines corresponding to a two-piece linear approximation of the set of customer segment demands; and calculating an error between the customer segment demands and the two-piece linear approximation comprising a first line and a second line. When the error is below a threshold, for each price, a line is selected from the first line or the second line that corresponds to a highest demand at the price; and an expression for the selected line is provided to the optimizer as the approximate per-segment demand model for the price during the time period. When the error exceeds a threshold the method includes calculating i) a third line that is a linear approximation of the set of customer segment demands for the first n/3 prices, ii) a fourth line that is a linear approximation of the set of customer segment demands for the second n/3 prices, and iii) a fifth line that is a linear approximation of the set of customer segment demands for the third n/3 prices; for each price, selecting one of the third line, the fourth line, or the fifth line that corresponds to a highest demand at the price; and providing an expression for the selected line to the optimizer as the approximate per-segment demand model for the price during the time period. These steps may be performed by the demand logic 260 of FIG. 2D controlling a processor (see FIG. 6). An expression for the selected line is provided to the optimizer as the approximate per-segment demand model for the price during the time period. This step may be performed by the allocation logic 220, the promotion logic 230 or 430, or the markdown logic 240 or 440 of FIG. 2A or 4 controlling a processor (see FIG. 6).

It can be seen from the foregoing description that the systems and methods described herein include a single layer of approximations to produce a mixed integer linear programming problem of the same dimension. Stock-outs, which impose additional non-smoothness to sales models, are taken into account by the described techniques. Multiple promotion price schedules targeting multiple different customer segments, each with different pricing preferences, are produced by the described techniques. The described framework computes the promotion portion of the price schedule for different customer segments in a manner that makes it possible to utilize mixed integer problem (MIP) solver-based parallelization. The described techniques can be applied to any demand model regardless of whether the model is non-linear or non-convex. Further, many different business constraints can be included in the solution process.

For simplicity sake in this description the terms objective function, approximate objective function, coefficient, variable, constraint, demand model, approximate demand model, and value have been used. It is to be understood that these terms are to be interpreted as meaning data or data structures that encode the objective function, approximate objective function, coefficient, variable, constraint, demand model, approximate demand model, or value in a manner interpretable by the computing elements described above. Inputting, outputting, receiving, transmitting, or other manipulation of these terms is to be interpreted as storing data in a storage medium, reading data from a storage medium, transmitting or receiving data by way of a network connection, acting on the data with a processor, as appropriate. Further, the term retailer should be interpreted as a computing device or devices under control of a retailer i) seeking a promotion and markdown portion or ii) pricing items according to the price schedule produced by the systems and methods described herein.

Computing Device Embodiment

Figure 6:
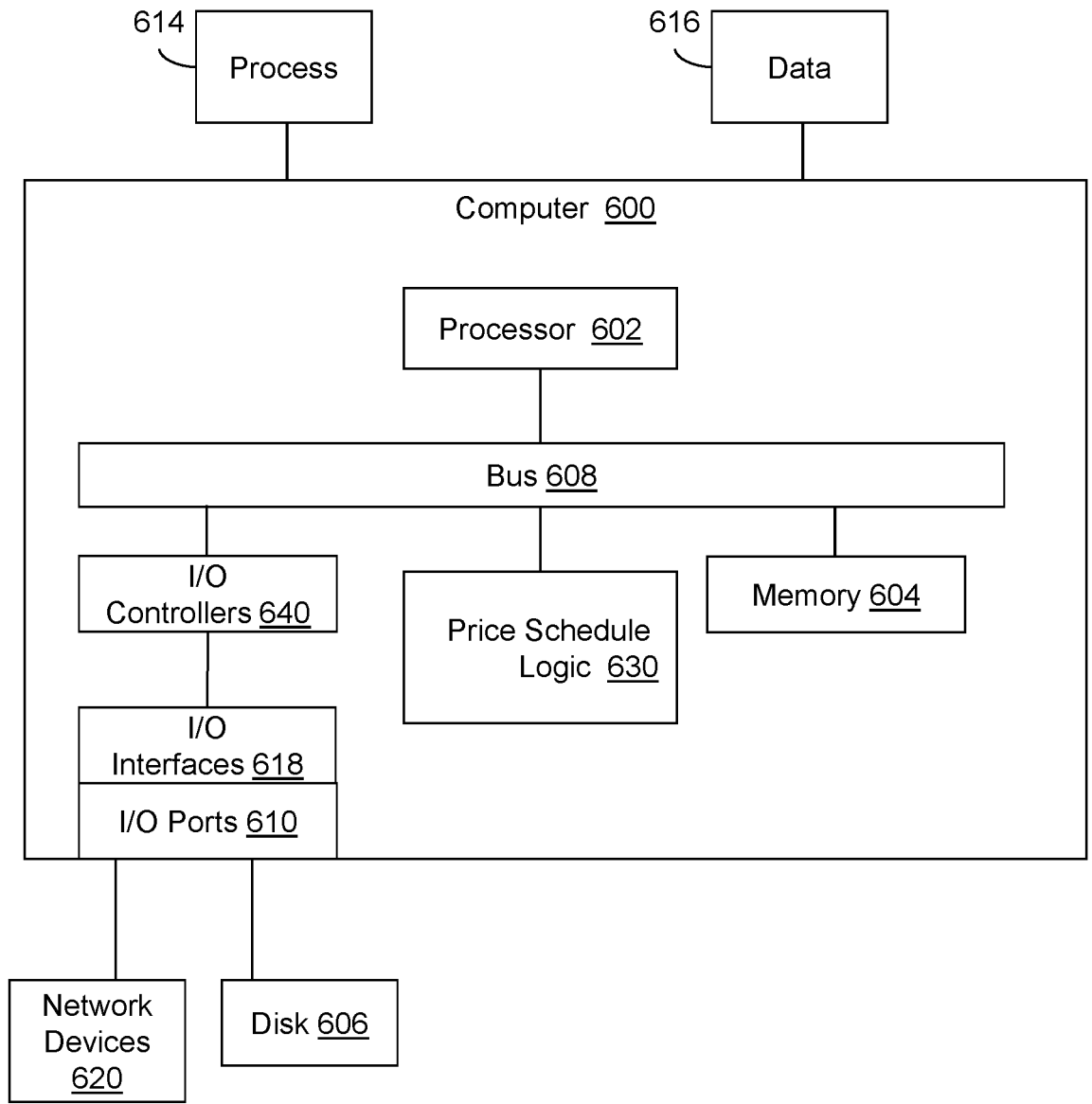
FIG. 6 illustrates an embodiment of a computing system configured with the example systems and/or methods disclosed.

FIG. 6 illustrates an example computing device that is configured and/or programmed with one or more of the example systems and methods described herein, and/or equivalents. The example computing device may be a computer 600 that includes a processor 602, a memory 604, and input/output ports 610 operably connected by a bus 608. In one example, the computer 600 may include price schedule logic 630 configured to create a promotion price and markdown schedule in a manner similar to the price schedule logic 110 and 410 shown in FIGS. 1 and 4 further explained in FIGS. 2A-2E and 4. In different examples, the price schedule logic 630 may be implemented in hardware, a non-transitory computer-readable medium with stored instructions, firmware, and/or combinations thereof. While the price schedule logic 630 is illustrated as a hardware component attached to the bus 608, it is to be appreciated that in other embodiments, the price schedule logic 630 could be implemented in the processor 602, stored in memory 604, or stored in disk 606.

In one embodiment, price schedule logic 630 or the computer is a means (e.g., structure: hardware, non-transitory computer-readable medium, firmware) for performing the actions described in FIGS. 1-5. In some embodiments, the computing device may be a server operating in a cloud computing system, a server configured in a "Software as a Service" (SaaS) architecture, a smart phone, laptop, tablet computing device, and so on.

The means may be implemented, for example, as an application specific integrated circuit (ASIC) programmed to perform the methods 300 and 500 of FIGS. 3 and 5, as further explained in FIGS. 1, 2A-2E, and 4. The means may also be implemented as stored computer executable instructions that are presented to computer 600 as data 616 that are temporarily stored in memory 604 and then executed by a processor 602.

Price schedule logic 630 may also provide means (e.g., hardware, non-transitory computer-readable medium that stores executable instructions, firmware) for performing the methods 300 and 500 of FIGS. 3 and 5, as further explained in FIGS. 1, 2A-2E, and 4.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, read only memory (ROM), programmable ROM (PROM), and so on. Volatile memory may include, for example, random access memory (RAM), synchronous random access memory (SRAM), dynamic random access memory (DRAM), and so on.

A storage disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a compact disk-read only memory (CD-ROM) drive, a CD recordable (CD-R) drive, a CD read/write (CD-RW) drive, a digital video disc (DVD) ROM, and so on. The memory 604 can store a process 614 and/or a data 616, for example. The disk 606 and/or the memory 604 can store an operating system that controls and allocates resources of the computer 600.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and universal serial bus (USB) ports.

The computer 600 can operate in a network environment and thus may be connected to the network devices 620 via the I/O interfaces 618, and/or the i/o ports 610. Through the network devices 620, the computer 600 may interact with a network. Through the network, the computer 600 may be logically connected to remote computers. Networks with which the computer 600 may interact include, but are not limited to, a local area network (LAN), a wide area network (WAN), and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the functions as described herein when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User" or "Retailer", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

Appendix A

Notation

| Set/Symbol | Size | Indices | Description |
| --- | --- | --- | --- |
| $\mathbb{P}$ | N | i | Set (number) of products |
| $\mathbb{S}$ | S | seg | Set (number) of customer segments |
| $\mathbb{T}$ | T | t | Set (number) of time periods for entire season (e.g., 1 ... T) |
| $\mathbb{T}_R$ | $T_R$ | t | Set (number) of time periods for regular season |
| $\mathbb{T}_C$ | $T_C$ | t | Set (number) of time periods for clearance season |
| $SUP_i^t$ | | | Replenishments for product i at beginning of time period t |
| $I_i^1$ | | | Initial inventory of an item i at the start of the season |
| $P_i^{full}$ | | | Full or regular price of product i (e.g., $45.99) |
| $C_i$ | | | Cost of product i |
| $P_i^{fullnorm}$ | | | Normalized regular/full price of product i (usually equals 1) |
| $C_i^{norm}$ | | | Normalized cost of product i (equals $C_i/P_i^{full}$) |
| $\mathbb{L}_i^p$ | $L_i^p$ | | Promotion Price ladder for product i (e.g., 1, 0.95, 0.90, ...) |
| $\mathbb{L}_i^m$ | $L_i^m$ | | Markdown Price ladder for product i |
| $\mathbb{L}_i^{pp}$ | $L_i^{pp}$ | | Planned Promotion Price ladder for product i |
| $ST_i^t$ | | | Sell-through target for product i at end of time-period t |
| $PPROMS_i$ | | | Number of times a product i can be promoted in $T_R$ periods |
| $PPRODS_t$ | | | Number of products that can be promoted in time-period t |
| $MPROMS_i$ | | | Number of times a product i can be marked down in $T_C$ periods |
| $MPRODS_t$ | | | Number of products that can be marked down in time-period t |

Demand Parameters

| Demand Parameter | Definition |
| --- | --- |
| $\gamma M_i^{t, seg}$ | Markdown price elasticity of an item i for segment seg at time t |
| $\gamma P_i^{t, seg}$ | Promotion price elasticity of an item i for segment seg at time t |
| $\gamma PP_i^{t, seg}$ | Planned promotion price elasticity of an item i for segment seg at time t |
| $PF_i^{t, seg}$ | Promo fatigue of price elasticity for an item i for segment seg at time t |
| $SEA_i^{t, seg}$ | Seasonally of an item i at time t for segment seg |
| $B_i^{t, seg}$ | Base demand (level) of an item i at time t for segment seg |
| $RP_i^{seg}$ | Return percentage of an item i for segment seg |
| $RL_i^{seg}$ | Return lead time of an item i for segment seg |

Decision Variables

| | Decision variables |
|---|---|
| $p_i^{t,seg}$ | Promotion Price of an item i in customer segment seg at time t ($t \in \mathbb{T}_R$) |
| $pm_i^t$ | Markdown price of an item i at time t ($t \in \mathbb{T}_C$) |
| $I_i^t$ | Inventory of an item i at beginning of time-period t ($I_i^1$ = initial inventory of an item i) |
| $\theta_i^{t,seg}$ | Revenue or Profit of an item i in customer segment seg at time t ($t \in \mathbb{T}$) |
| | Auxiliary decision variables |
| $x_i^{t,seg}$ | Equals 1 when there is a price change for product i in customer segment seg at time t |
| $u_i^{t,seg}$ | Equals 1 when there is a price change for product i in customer segment seg at time t when compared to time period t − 1 |
| $v_i^{t,seg}$ | Equals 1 when there is a price change for product i in customer segment seg at time t when compared to regular price in time period t |
| $y_i^{t,seg}$ | Sales of product i in customer segment seg at time t |
| $d_i^{t,seg}$ | Demand for product i in customer segment seg at time t |
| $z_i^{t,seg}$ | Variable denoting McCormick relaxation for $p_i^{t,seg} \times y_i^{t,seg}$ |
| $w_i^{t,seg}$ | Index denoting which point in ladder is picked |
| $k_i^{t,seg}$ | Equals 1 when there is a price change for product i in customer segment seg at time t |
| $\delta_i^t$ | Equals 1 when there is a price change for product i in customer segment seg at time t |
| $I_i^{t,seg}$ | Inventory of an item i at beginning of time-period t for customer segment seg ($I_i^{1,seg}$ = initial inventory of an item i for segment seg) |
| $sup_i^{t,seg}$ | Replenishment of an item i at beginning of time-period t for customer segment seg |
| $bd_i^{t,seg}$ | Binary variable equals 1 when the first line is chosen for the demand approximation; 0 for choosing second line |
| $bmck_i^{1,t,seg}$ | Binary variable equals 1 when the first piece is chosen for McCormick approximation for an item i at time-period t for customer segment seg; 0 otherwise. |
| $bmck_i^{2,t,seg}$ | Binary variable equals 1 when the second piece is chosen for McCormick approximation for an item i at time-period t for customer segment seg; 0 otherwise. |
| | Output variables |
| $p\_opt_i^{t,seg}$ | Optimal promotion price of an item i in customer segment seg at time t ($t \in \mathbb{T}_R$) |
| $pm\_opt_i^t$ | Optimal markdown price of an item i at time t ($t \in \mathbb{T}_C$) |
| $I\_opt_i^t$ | Optimal inventory of an item i at beginning of time-period t |
| $y\_opt_i^{t,seg}$ | Optimal sales of product i in customer segment seg at time t |

** Please note that superscript seg is dropped when dealing with clearance periods

Constraints

| | Objective function | McCormick Approximation Formulation |
|---|---|---|
| | Maximize Revenue | $\max \sum_{i=1}^{N} \sum_{t=1}^{T_R} \sum_{seg=1}^{S} P_i^{full} \theta_i^{t,seg} + \sum_{i=1}^{N} \sum_{t=T_R+1}^{T} P_i^{full} \theta_i^t$ |

| C#: Name (prefix) | Inequalities |
|---|---|
| C1: price ladder (pricelad) | $\forall i \in \mathbb{P}, t \in \mathbb{T}_R, seg \in \mathbb{S}: p_i^{t,seg} = \hat{\alpha}_i^{t,seg} - \hat{\beta}_i^{t,seg} w_i^{t,seg}$<br>$\forall i \in \mathbb{P}, t \in \mathbb{T}_C: pm_i^t = \alpha_i^t - \beta_i^t w_i^t$ |
| C2: Price Change Identification (pricechid) | $\forall i \in \mathbb{P}, t \in \mathbb{T}_R, seg \in \mathbb{S}: p_i^{fullnorm} - p_i^{t,seg} \geq \dfrac{v_i^{t,seg}}{M_1}$<br><br>$\forall i \in \mathbb{P}, t \in \mathbb{T}_R, seg \in \mathbb{S}: p_i^{t-1,seg} - p_i^{t,seg} + \dfrac{u_i^{t,seg}}{M_1} \leq \kappa_i^{t,seg} M_1$<br><br>$\forall i \in \mathbb{P}, t \in \mathbb{T}_R, seg \in \mathbb{S}: p_i^{t,seg} - p_i^{t-1,seg} + \dfrac{u_i^{t,seg}}{M_1} \leq (1 - \kappa_i^{t,seg}) M_1$<br><br>$\forall i \in \mathbb{P}, t \in \mathbb{T}_R, seg \in \mathbb{S}: x_i^{t,seg} \leq u_i^{t,seg}$<br>$\forall i \in \mathbb{P}, t \in \mathbb{T}_R, seg \in \mathbb{S}: x_i^{t,seg} \leq v_i^{t,seg}$<br>$\forall i \in \mathbb{P}, t \in \mathbb{T}_R, seg \in \mathbb{S}: 1 + x_i^{t,seg} \geq u_i^{t,seg} + v_i^{t,seg}$<br>$\forall i \in \mathbb{P}, t \in \mathbb{T}_C$: Repeat above by dropping superscript seg and using $pm_i^t$<br>Add the markdown count constraints |
| C3: Promo Price Change Limits (ppricechlt) | $\forall i \in \mathbb{P}, t \in \mathbb{T}_R, seg \in \mathbb{S}: \sum_{t=1}^{T_R} x_i^{t,seg} \leq PPROMS_i$<br><br>$\forall i \in \mathbb{P}, t \in \mathbb{T}_R, seg \in \mathbb{S}: \sum_{i=1}^{N} x_i^{t,seg} \leq PPRODS_t$ |
| C4: Markdown Price Change Limits (mpricechlt) | $\forall i \in \mathbb{P}: \sum_{t \in \mathbb{T}_C} x_i^t \leq MPROMS_i$<br><br>$\forall i \in \mathbb{P}, t \in \mathbb{T}_C: \sum_{i=1}^{N} x_i^t \leq MPRODS_t$ |
| C5: Sell-through (sellthru) | $\forall i \in \mathbb{P}, t \in \mathbb{T}: I_i^t - \sum_{seg \in \mathbb{S}} y_i^{t,seg} \leq (1 - ST_i^t) I_i^1$ |

| C#: Name (prefix) | Inequalities |
|---|---|
| C6: Inventory conservation (invflow) | $\forall i \in \mathbb{P}, t \in \mathbb{T}, t \geq 2: I_i^t = I_i^{t-1} + SUP_i^t - \sum_{seg \in \mathbb{S}} y_i^{t,seg}$ |
| C7: Sales calculation (salescalc) | $\forall i \in \mathbb{P}, t \in \mathbb{T}_R: \Sigma_{seg \in \mathbb{S}} y_i^{t,seg} \leq \Sigma_{seg \in \mathbb{S}} d_i^{t,seg}$ and $\Sigma_{seg \in \mathbb{S}} y_i^{t,seg} \leq I_i^t + SUP_i^t$<br>$\forall i \in \mathbb{P}, t \in \mathbb{T}_R, seg \in \mathbb{S}: y_i^{t,seg} \geq \hat{d}_i^{t,seg} - \delta_i^t M_2$<br>$\forall i \in \mathbb{P}, t \in \mathbb{T}_R, seg \in \mathbb{S}: \Sigma_{seg \in \mathbb{S}} y_i^{t,seg} \geq I_i^t + SUP_i^t - (1 - \delta_i^t)M_2$<br>$\forall i \in \mathbb{P}, t \in \mathbb{T}_C: y_i^t \leq \hat{d}_i^t$ and $y_i^t \leq I_i^t + SUP_i^t$<br>$\forall i \in \mathbb{P}, t \in \mathbb{T}_C: y_i^t \geq \hat{d}_i^{t,seg} - \delta_i^t M_2$<br>$\forall i \in \mathbb{P}, t \in \mathbb{T}_C: y_i^t \geq I_i^t + SUP_i^t - (1 - \delta_i^t)M_2$ |
| C8: Demand calculation (demcalc) | $\forall i \in \mathbb{P}, t \in \mathbb{T}_R, seg \in \mathbb{S}:$<br>$\hat{d}_i^{t,seg} \leq \overline{m}_i^{t,seg} p_i^{t,seg} + \overline{c}_i^{t,seg} + (1 - bd_i^{t,seg})M_3$<br>$\hat{d}_i^{t,seg} \leq \hat{m}_i^{t,seg} p_i^{t,seg} + \hat{c}_i^{t,seg} + bd_i^{t,seg} M_3$<br>$\overline{m}_i^{t,seg} p_i^{t,seg} + \overline{c}_i^{t,seg} \leq \hat{m}_i^{t,seg} p_i^{t,seg} + \hat{c}_i^{t,seg} + bd_i^{t,seg} M_3$<br>$\hat{m}_i^{t,seg} p_i^{t,seg} + \hat{c}_i^{t,seg} \leq \overline{m}_i^{t,seg} p_i^{t,seg} + \overline{c}_i^{t,seg} + (1 - bd_i^{t,seg})M_3$<br>$\forall i \in \mathbb{P}, t \in \mathbb{T}_C:$<br>$y_i^t \leq \overline{m}_i^t pm_i^t + \overline{c}_i^t + (1 - bd_i^t)M_3$<br>$y_i^t \leq \hat{m}_i^t pm_i^t + \hat{c}_i^t + bd_i^t M_3$<br>$\overline{m}_i^t pm_i^t + \overline{c}_i^t \leq \hat{m}_i^t pm_i^t + \hat{c}_i^t + bd_i^t M_3$<br>$\hat{m}_i^t pm_i^t + \hat{c}_i^t \leq \overline{m}_i^t pm_i^t + \overline{c}_i^t + (1 - bd_i^t)M_3$ |
| C9: objective function McCormick approximation (objmck) | $\forall i \in \mathbb{P}, t \in \mathbb{T}_R, seg \in \mathbb{S}:$ (first piece)<br>$\theta_i^{t,seg} \geq Y_{U,i}^{1,t,seg} p_i^{t,seg} + P_{U,i}^{t,seg} y_i^{t,seg} - Y_{U,i}^{1,t,seg} P_{U,i}^{t,seg} - (1 - bmck_i^{1,t,seg})M_4$<br>$\theta_i^{t,seg} \geq Y_{L,i}^{1,t,seg} p_i^{t,seg} + P_{L,i}^{t,seg} y_i^{t,seg} - Y_{L,i}^{1,t,seg} P_{L,i}^{t,seg} - (1 - bmck_i^{1,t,seg})M_4$<br>$\theta_i^{t,seg} \leq Y_{U,i}^{1,t,seg} p_i^{t,seg} + P_{L,i}^{t,seg} y_i^{t,seg} - Y_{U,i}^{1,t,seg} P_{L,i}^{t,seg} + (1 - bmck_i^{1,t,seg})M_4$<br>$\theta_i^{t,seg} \leq Y_{L,i}^{1,t,seg} p_i^{t,seg} + P_{U,i}^{t,seg} y_i^{t,seg} - Y_{L,i}^{1,t,seg} P_{U,i}^{t,seg} + (1 - bmck_i^{1,t,seg})M_4$<br>$\forall i \in \mathbb{P}, t \in \mathbb{T}_R, seg \in \mathbb{S}:$ (second piece)<br>$\theta_i^{t,seg} \geq Y_{U,i}^{2,t,seg} p_i^{t,seg} + P_{U,i}^{t,seg} y_i^{t,seg} - Y_{U,i}^{2,t,seg} P_{U,i}^{t,seg} - (1 - bmck_i^{2,t,seg})M_4$<br>$\theta_i^{t,seg} \geq Y_{L,i}^{2,t,seg} p_i^{t,seg} + P_{L,i}^{t,seg} y_i^{t,seg} - Y_{L,i}^{2,t,seg} P_{L,i}^{t,seg} - (1 - bmck_i^{2,t,seg})M_4$<br>$\theta_i^{t,seg} \leq Y_{U,i}^{2,t,seg} p_i^{t,seg} + P_{L,i}^{t,seg} y_i^{t,seg} - Y_{U,i}^{2,t,seg} P_{L,i}^{t,seg} + (1 - bmck_i^{2,t,seg})M_4$<br>$\theta_i^{t,seg} \leq Y_{L,i}^{2,t,seg} p_i^{t,seg} + P_{U,i}^{t,seg} y_i^{t,seg} - Y_{L,i}^{2,t,seg} P_{U,i}^{t,seg} + (1 - bmck_i^{2,t,seg})M_4$<br>$bmck_i^{1,t,seg} + bmck_i^{2,t,seg} = 1$<br>$\forall i \in \mathbb{P}, t \in \mathbb{T}_C:$ Repeat above by dropping superscript seg and using $pm_i^t$ |
| C10 Self No-Touch | $\sum_{\tau=t}^{t+S_i} \sum_{k=1}^{K} \gamma_\tau^{ik} \leq 1 \forall i, t$ |
| C11 Cross No-Touch | $\sum_{k=1}^{K} \gamma_t^{jk} + \sum_{\tau=t}^{t+S_{ij}} \sum_{k=1}^{K} \gamma_\tau^{jk} \leq 1 \forall (i, j), t \in T$ |
| C12 Must Promote | $\sum_{k=1}^{K} \gamma_t^{ik} = \sum_{k=1}^{K} \gamma_t^{jk} \forall (i, j), t \in T$ |
| C13 Cannot Promote | $\sum_{k=1}^{K} \gamma_t^{ik} + \sum_{k=1}^{K} \gamma_t^{jk} \leq 1 \forall (i, j), t \in T$ |
| C14 Inter-Item | $\sum_{k=1}^{K} \gamma_t^{ik} = \sum_{k=1}^{K} \gamma_\tau^{jk} \forall (i, j), t \in T$ |

What is claimed is:

1. A non-transitory computer storage medium storing computer-executable instructions that when executed by a computing device, cause the computing device to:
  receive by the computing device (i) a set of promotion prices for an item, (ii) a set of markdown prices for the item, (iii) an inventory quantity for the item, (iv) a per-segment demand model for the item, and (v) an objective function that is a function of the per-segment demand model;
  generate a set of promotion-markdown prices for the item by applying, to each markdown price, respective promotion rates that resulted in the respective promotion prices;
  allocate the inventory quantity amongst a plurality of customer segments, based at least on a predicted contribution of each customer segment to the objective function;
  for each customer segment, determine, by an external optimizer, a promotion portion of a price schedule that maximizes the objective function in response to transmitting the set of prices, an inventory quantity allocated to the customer segment, an approximate per-segment demand model, and an approximate objective function to the optimizer by the computing device, where the promotion portion comprises a series of prices selected from the set of promotion prices for respective time periods during a regular season for the item;
  for each customer segment, determine, by the optimizer, a markdown portion of the price schedule for the item that maximizes the objective function in response to transmitting the set of prices, a quantity of inventory allocated to the customer segment remaining at the end of the regular season, the approximate per-segment demand model, and the approximate objective function to the optimizer by the computing device, where the markdown portion comprises a series of prices selected from the set of promotion-markdown prices for respective time periods during a clearance season for the item;

for each customer segment, receive from an optimizer (i) a common markdown price for respective time periods that optimizes the objective function, and (ii) a received promotion-markdown price;

for each customer segment, adjust the promotion-markdown prices in the markdown portion by, for each time period:
  identifying a promotion-markdown price in the set of promotion-markdown prices that (i) resulted from applying a promotion rate to the common markdown price and (ii) is closest to the received promotion-markdown price for the customer segment; and
  replacing the received promotion-markdown price with the identified promotion-markdown price;

combine the promotion portion and the markdown portion to create the price schedule for the item; and transmit the price schedule over a network to a pricing device to control assignment of prices for the item according to the price schedule.

2. The non-transitory computer storage medium of claim 1, further comprising instructions configured to cause the computing device to allocate the inventory quantity amongst customer segments by:
  for each customer segment:
    allocating an entirety of the inventory quantity to the customer segment;
    transmitting, to the optimizer, the entirety of the inventory quantity, a subset of the promotion prices and a subset of the markdown prices, an approximate per-segment demand model, and an approximate objective function; and
    receiving, from the optimizer, a per segment value of the approximate objective function for the customer segment;
  computing a ratio of the per segment value to a sum of all per segment values for the customer segments; and
  allocating the inventory amongst the customer segments according to the ratio for each customer segment.

3. The non-transitory computer storage medium of claim 1, further comprising instructions configured to cause the computing device to create the price schedule for each customer segment by:
  providing the set of promotion prices, the set of promotion-markdown prices, the inventory quantity allocated to the customer segment, an approximate per-segment demand model, and an approximate objective function to the optimizer; and
  receiving, from the optimizer, a promotion portion for each customer segment that optimizes the objective function and a markdown portion for each customer segment that optimizes the objective function.

4. The non-transitory computer storage medium of claim 3, further comprising instructions configured to cause the computing device to adjust the markdown portion received from the optimizer for each customer segment by:
  determining a remaining inventory quantity for each customer segment at the end of the regular season;
  providing the set of promotion prices, the set of markdown prices, the aggregate inventory quantity, the approximate per-segment demand model, a common markdown constraint that specifies that markdown prices must be the same across all customer segments in each time period, and the approximate objective function to the optimizer;
  receiving, from the optimizer, an aggregate markdown portion comprising a series of the common markdown prices for all customer segments in respective time periods that optimizes the objective function; and
  adjusting each promotion-markdown price in the markdown portion for the customer segment based at least on the common markdown price.

5. The non-transitory computer storage medium of claim 3, further comprising instructions configured to cause the computing device to:
  calculate a line corresponding to a linear approximation of the set of promotion prices, where the line is a function of a position variable that evenly divides the line into segments between a maximum price and a minimum price, where each integer value of the position variable is associated with a price in the set of prices;
  calculating an error between the line and the set of promotion prices;
  until the error is less than a threshold:
    identifying an integer value at which the error is highest;
    breaking the line into a first line and a second line, such the first line is a linear approximation of a first subset of promotion prices that precede the identified integer value and the second line is a linear approximation of a second subset of promotion prices that succeed the identified integer value;
  provide a set of expressions for respective lines as associated with respective integer values to the optimizer as the set of promotion prices for the item; and
  receive, from the optimizer, an integer value for the position variable that corresponds to a selected promotion price; and
  identify a price in the set of promotion prices that corresponds to the position variable; and
  include the identified price in the price schedule for the item.

6. The non-transitory computer storage medium of claim 3, further comprising instructions configured to cause the computing device to determine the promotion portion and the markdown portion for each customer segment by:
  for each time period, calculating a set of customer segment demands for the item when the item is priced at respective prices in the set of prices, further where there are n prices in the set of prices;
  calculating two lines corresponding to a two-piece linear approximation of the set of customer segment demands;
  calculating an error between the customer segment demands and the two-piece linear approximation comprising a first line and a second line;
  when the error is below a threshold:
    for each price, selecting a line from the first line or the second line that corresponds to a highest demand at the price; and
    providing an expression for the selected line to the optimizer as the approximate per-segment demand model for the price during the time period;
  when the error exceeds a threshold:
    calculating i) a third line that is a linear approximation of the set of customer segment demands for the first n/3 prices, ii) a fourth line that is a linear approximation of the set of customer segment demands for the second n/3 prices, and iii) a fifth line that is a linear approximation of the set of customer segment demands for the third n/3 prices;

for each price, selecting one of the third line, the fourth line, or the fifth line that corresponds to a highest demand at the price; and providing an expression for the selected line to the optimizer as the approximate per-segment demand model for the price during the time period.

7. A computing system, comprising:

price logic configured to determine a price schedule for an item by inputting (i) a set of promotion prices for the item, (ii) a set of markdown prices for the item, (iii) an inventory quantity for the item, (iv) a per-segment demand model for the item, and (v) an objective function that is a function of the per-segment demand model;

promotion-markdown logic configured to generate a set of promotion-markdown prices for the item by applying, to each markdown price, respective promotion rates that resulted in the respective promotion prices;

allocation logic configured to allocate the inventory quantity amongst a plurality of customer segments based at least on a predicted contribution of each customer segment to the objective function;

promotion logic configured to, for each customer segment:

determine, by an external optimizer, a promotion portion of a price schedule that maximizes the objective function in response to transmitting the set of prices, an inventory quantity allocated to the customer segment, an approximate per-segment demand model, and an approximate objective function to the optimizer by the computing device, where the promotion portion comprises a series of prices selected from the set of promotion prices for respective time periods during a regular season for the item;

determine, by the optimizer, a markdown portion of the price schedule for the item that maximizes the objective function in response to transmitting the set of prices, a quantity of inventory allocated to the customer segment remaining at the end of the regular season, the approximate per-segment demand model, and the approximate objective function to the optimizer by the computing system, where the markdown portion comprises series of prices selected from the set of promotion-markdown prices for respective time periods during a clearance season for the item;

an optimizer, from which the computing system receives (i) a common markdown price for respective time periods that optimizes the objective function, and (ii) a received promotion-markdown;

where the promotion-markdown logic is further configured to adjust each promotion-markdown price in the markdown portion for the customer segment by, for each time period:

identifying a promotion-markdown price in the set of promotion-markdown prices that (i) resulted from applying a promotion rate to the common markdown price and (ii) is closest to the received promotion-markdown price for the customer segment; and replacing the received promotion-markdown price with the identified promotion-markdown price;

where the promotion-markdown logic is further configured to combine the promotion portion and the markdown portion to create the price schedule for the item; and where the promotion-markdown logic is further configured to transmit the price schedule over a network to a pricing device to control assignment of prices for the item according to the price schedule.

8. The computing system of claim 7, where the allocation logic is configured to allocate the inventory quantity amongst customer segments by:

for each customer segment:

allocating an entirety of the inventory quantity to the customer segment;

transmitting, to the optimizer, the entirety of the inventory quantity, a subset of the promotion prices and a subset of the markdown prices, an approximate per-segment demand model, and an approximate objective function; and receiving, from the optimizer, a per segment value of the approximate objective function for the customer segment;

computing a ratio of the per segment value to a sum of all per segment values for the customer segments; and allocating the inventory amongst the customer segments according to the ratio for each customer segment.

9. The computing system of claim 7, where the promotion logic is configured to determine the price schedule for each customer segment by:

providing the set of promotion prices, the set of promotion-markdown prices, the inventory quantity allocated to the customer segment, an approximate per-segment demand model, and an approximate objective function to the optimizer; and receiving, from the optimizer, a promotion portion for each customer segment that optimizes the objective function and a markdown portion for each customer segment that optimizes the objective function.

10. The computing system of claim 9, where the promotion-markdown logic is configured to determine a remaining inventory quantity for each customer segment at the end of the regular season, the system further comprising:

markdown logic configured to:

provide the set of promotion prices, the set of markdown prices, the aggregate inventory quantity, the approximate per-segment demand model, a common markdown constraint that specifies that markdown prices must be the same across all customer segments in each time period, and the approximate objective function to the optimizer; and receive, from the optimizer, an aggregate markdown portion comprising a series of the common markdown prices for all customer segments in respective time periods that optimizes the objective function.

11. The computing system of claim 9, comprising price logic configured to:

calculate a line corresponding to a linear approximation of the set of promotion prices, where the line is a function of a position variable that evenly divides the line into segments between a maximum price and a minimum price, where each integer value of the position variable is associated with a price in the set of prices;

calculate an error between the line and the set of promotion prices;

until the error is less than a threshold:

identifying an integer value at which the error is highest;

breaking the line into a first line and a second line, such the first line is a linear approximation of a first subset of promotion prices that precede the identified integer value and the second line is a linear approximation of a second subset of promotion prices that succeed the identified integer value;

provide a set of expressions for respective lines as associated with respective integer values to the optimizer as the set of promotion prices for the item; and where the promotion logic is configured to:
receive, from the optimizer, an integer value for the position variable that corresponds to a selected promotion price; and
identify a price in the set of promotion prices that corresponds to the position variable; and
include the identified price in the price schedule for the item.

12. The computing system of claim 9, comprising demand logic configured to:
for each time period, calculating a set of customer segment demands for the item when the item is priced at respective prices in the set of prices, further where there are n prices in the set of prices;
calculating two lines corresponding to a two-piece linear approximation of the set of customer segment demands;
calculating an error between the customer segment demands and the two-piece linear approximation comprising a first line and a second line;
when the error is below a threshold:
for each price, selecting a line from the first line or the second line that corresponds to a highest demand at the price; and
providing an expression for the selected line to the optimizer as the approximate per-segment demand model for the price during the time period;
when the error exceeds a threshold:
calculating i) a third line that is a linear approximation of the set of customer segment demands for the first n/3 prices, ii) a fourth line that is a linear approximation of the set of customer segment demands for the second n/3 prices, and iii) a fifth line that is a linear approximation of the set of customer segment demands for the third n/3 prices;
for each price, selecting one of the third line, the fourth line, or the fifth line that corresponds to a highest demand at the price; and
where the promotion logic is configured to provide an expression for the selected line to the optimizer as the approximate per-segment demand model for the price during the time period.

13. A computer-implemented method comprising:
receiving by the computer (i) a set of promotion prices for an item, (ii) a set of markdown prices for the item, (iii) an inventory quantity for the item, (iv) a per-segment demand model for the item, and (v) an objective function that is a function of the per-segment demand model;
generating a set of promotion-markdown prices for the item by applying, to each markdown price, respective promotion rates that resulted in the respective promotion prices;
allocating the inventory quantity amongst a plurality of customer segments based at least on a predicted contribution of each customer segment to the objective function;

for each customer segment, determining, by an external optimizer, a promotion portion of a price schedule that maximizes the objective function in response to transmitting the set of prices, an inventory quantity allocated to the customer segment, an approximate per-segment demand model, and an approximate objective function to the optimizer by the computer, where the promotion portion comprises a series of prices selected from the set of promotion prices for respective time periods during a regular season for the item;

for each customer segment, determining, by the optimizer, a markdown portion of the price schedule for the item that maximizes the objective function in response to transmitting the set of prices, a quantity of inventory allocated to the customer segment remaining at the end of the regular season, the approximate per-segment demand model, and the approximate objective function to the optimizer by the computing device, where the markdown portion comprises series of prices selected from the set of promotion-markdown prices for respective time periods during a clearance season for the item;

for each customer segment, receiving from an optimizer (i) a common markdown price for respective time periods that optimizes the objective function, and (ii) a received promotion-markdown;

for each customer segment, adjusting the promotion-markdown prices in the markdown portion by, for each time period:
identifying a promotion-markdown price in the set of promotion-markdown prices that (i) resulted from applying a promotion rate to the common markdown price and (iii) is closest to the received promotion-markdown price for the customer segment; and
replacing the received promotion-markdown price with the identified promotion-markdown price;

combining the promotion portion and the markdown portion to create the price schedule for the item; and transmitting the price schedule over a network to a pricing device to control assignment of prices for the item according to the price schedule data structure.

14. The computer-implemented method of claim 13, where the allocating comprises:
for each customer segment:
allocating an entirety of the inventory quantity to the customer segment;
transmitting, to the optimizer, the entirety of the inventory quantity, a subset of the promotion prices and a subset of the markdown prices, an approximate per-segment demand model, and an approximate objective function; and
receiving, from the optimizer, a per segment value of the approximate objective function for the customer segment;
computing a ratio of the per segment value to a sum of all per segment values for the customer segments; and
allocating the inventory amongst the customer segments according to the ratio for each customer segment.

15. The computer-implemented method of claim 13, where creating the price schedule for each customer segment comprises:
providing the set of promotion prices, the set of promotion-markdown prices, the inventory quantity allocated to the customer segment, an approximate per-segment demand model, and an approximate objective function to the optimizer; and
receiving, from the optimizer, a promotion portion for each customer segment that optimizes the objective function and a markdown portion for each customer segment that optimizes the objective function.

16. The computer-implemented method of claim 15, further comprising:
    determining a remaining inventory quantity for each customer segment at the end of the regular season;
    providing the set of promotion prices, the set of markdown prices, the aggregate inventory quantity, the approximate per-segment demand model, a common markdown constraint that specifies that markdown prices must be the same across all customer segments in each time period, and the approximate objective function to the optimizer;
    receiving, from the optimizer, an aggregate markdown portion comprising a series of the common markdown prices for all customer segments in respective time periods that optimizes the objective function; and
    adjusting each promotion-markdown price in the markdown portion for the customer segment based at least on the common markdown price.

17. The computer-implemented method of claim 15, further comprising:
    calculating a line corresponding to a linear approximation of the set of promotion prices, where the line is a function of a position variable that evenly divides the line into segments between a maximum price and a minimum price, where each integer value of the position variable is associated with a price in the set of prices;
    calculating an error between the line and the set of promotion prices;
      until the error is less than a threshold:
      identifying an integer value at which the error is highest;
      breaking the line into a first line and a second line, such the first line is a linear approximation of a first subset of promotion prices that precede the identified integer value and the second line is a linear approximation of a second subset of promotion prices that succeed the identified integer value;
    providing a set of expressions for respective lines as associated with respective integer values to the optimizer as the set of promotion prices for the item; and receiving, from the optimizer, an integer value for the position variable that corresponds to a selected promotion price; and
    identifying a price in the set of promotion prices that corresponds to the position variable; and
    including the identified price in the price schedule for the item.

18. The computer-implemented method of claim 15, further comprising:
    for each time period, calculating a set of customer segment demands for the item when the item is priced at respective prices in the set of prices, further where there are n prices in the set of prices;
    calculating two lines corresponding to a two-piece linear approximation of the set of customer segment demands;
    calculating an error between the customer segment demands and the two-piece linear approximation comprising a first line and a second line;
    when the error is below a threshold:
      for each price, selecting a line from the first line or the second line that corresponds to a highest demand at the price; and
      providing an expression for the selected line to the optimizer as the approximate per-segment demand model for the price during the time period;
    when the error exceeds a threshold:
      calculating i) a third line that is a linear approximation of the set of customer segment demands for the first n/3 prices, ii) a fourth line that is a linear approximation of the set of customer segment demands for the second n/3 prices, and iii) a fifth line that is a linear approximation of the set of customer segment demands for the third n/3 prices;
      for each price, selecting one of the third line, the fourth line, or the fifth line that corresponds to a highest demand at the price; and
    providing an expression for the selected line to the optimizer as the approximate per-segment demand model for the price during the time period.

* * * * *

UNITED STATES PATENT AND TRADEMARK OFFICE
CERTIFICATE OF CORRECTION

PATENT NO. : 10,776,803 B2
APPLICATION NO. : 15/062561
DATED : September 15, 2020
INVENTOR(S) : Kannan et al.

It is certified that error appears in the above-identified patent and that said Letters Patent is hereby corrected as shown below:

On the Title Page

Item (56), Column 2, under Other Publications, Line 2, delete "Intemational" and insert -- International --, therefor.

In the Drawings

On sheet 6 of 10, in FIG. 2E, Line 21, delete "Funtion" and insert -- Function --, therefor.

In the Specification

In Column 6, Line 15, delete "$p_i^{t,seg} = \alpha_i^{t,seg} - \beta_i^{t,seg} w_i^{t,seg}$" and insert -- $p_i^{t,seg} = \hat{\alpha}_i^{t,seg} - \hat{\beta}_i^{t,seg} w_i^{t,seg}$ --, therefor.

In Column 6, Line 18, delete "$\hat{\beta}_i^{t,seg}$" and insert -- $\hat{\beta}_i^{t,seg}$, --, therefor.

In Column 10, Line 12, delete "$\nabla i \in$" and insert -- $\forall i \in$ --, therefor.

In Column 10, Line 16, delete "$\nabla i \in$" and insert -- $\forall i \in$ --, therefor.

In Column 25, Line 7, delete "$v_i^{t,seg}$" and insert -- $v_i^{t,seg}$ --, therefor.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,776,803 B2

In Columns 25-26, Line 29, delete "$\alpha_i^t - \beta_i^t w_i^t$" and insert -- $\hat{\alpha}_i^t - \hat{\beta}_i^t w_i^t$ --, therefor.

In Columns 25-26, Line 36, below

"$\forall\, i \in \mathbb{P},\, t \in \mathbb{T}_R,\, \text{seg} \in \mathbb{S}:\ p_i^{fullnorm} - p_i^{t,seg} \geq \dfrac{v_i^{t,seg}}{M_1}$" insert -- $\forall i \in \mathbb{P}, t \in \mathbb{T}_R, seg \in \mathbb{S}:\ p_i^{fullnorm} - p_i^{t,seg} \leq v_i^{t,seg} M_1$ --.

In Columns 27-28, Line 6, delete "$d_i^{t,seg}$" and insert -- $\hat{d}_i^{t,seg}$ --, therefor.

In Columns 27-28, Line 23, Delete "(1 bmck$_i^{1,t,seg}$)M$_4$" and insert -- $\left(1 - bmck_i^{1,t,seg}\right)M_4$ --, therefor.

In Columns 27-28, Line 40, delete "$\gamma_t^{jk}$" and insert -- $\Upsilon_t^{jk}$ --, therefor.

In Columns 27-28, Line 42, delete "$\gamma_t^{jk}$" and insert -- $\Upsilon_t^{jk}$ --, therefor.

In the Claims

In Column 34, Line 32, in Claim 13, delete "(iii)" and insert -- (ii) --, therefor.